(12) United States Patent
Jacobson et al.

(10) Patent No.: US 8,637,209 B2
(45) Date of Patent: Jan. 28, 2014

(54) CATHODE AND ELECTROLYTE MATERIALS FOR SOLID OXIDE FUEL CELLS AND ION TRANSPORT MEMBRANES

(76) Inventors: Allan J. Jacobson, Houston, TX (US); Shuangyan Wang, Pearland, TX (US); Gun Tae Kim, Ulsan (KR)

( * ) Notice: Subject to any disclaimer, the term of this patent is extended or adjusted under 35 U.S.C. 154(b) by 369 days.

(21) Appl. No.: 11/990,295

(22) PCT Filed: Aug. 9, 2006

(86) PCT No.: PCT/US2006/031234
§ 371 (c)(1),
(2), (4) Date: Jul. 21, 2010

(87) PCT Pub. No.: WO2008/048225
PCT Pub. Date: Apr. 24, 2008

(65) Prior Publication Data
US 2010/0291471 A1 Nov. 18, 2010

Related U.S. Application Data

(60) Provisional application No. 60/706,836, filed on Aug. 9, 2005.

(51) Int. Cl.
*H01M 4/62* (2006.01)
*H01M 4/90* (2006.01)
*H01M 4/88* (2006.01)

(52) U.S. Cl.
USPC .......... 429/532; 429/523; 429/527; 429/182.1

(58) Field of Classification Search
None
See application file for complete search history.

(56) References Cited

U.S. PATENT DOCUMENTS

| | | | |
|---|---|---|---|
| 4,987,115 A | 1/1991 | Michel-Kim | |
| 5,089,030 A | 2/1992 | Michel-Kim | |
| 2002/0031694 A1* | 3/2002 | Van Berkel et al. | 429/30 |
| 2002/0095866 A1 | 7/2002 | Hassett | |
| 2006/0130401 A1 | 6/2006 | Giglio et al. | |

FOREIGN PATENT DOCUMENTS

| | | |
|---|---|---|
| EP | 0 309 387 A2 | 3/1989 |
| EP | 0 428 806 A1 | 5/1991 |
| EP | 0 924 288 A2 | 6/1999 |
| WO | 2006064320 A1 | 6/2006 |

OTHER PUBLICATIONS

"Heat capacity of ternary oxides of LnCaMn2O5.5 (Ln-Nd, Gd, E) at 298. 15-673K" Database Inspec (Online) The Institution of Electrical Engineers, Stevenage, GB; Jul. 1996, Oralova et.al.*

Troyanchuk et al. Preparation and magnetic and Electrical Properties of EuBaMn2O6-g (g=0,1), Physics of the Solid State, vol. 45, No. 2, pp. 276-282, 2003, EnglishTranslation.*

Conder et al. Journal of Physics: Condensed matter (2005), 17(37), 5813-5820.*

Anderson et al. Solid State Sciences, 7(2005), 1149-1156.*

* cited by examiner

*Primary Examiner* — Cynthia K. Walls
(74) *Attorney, Agent, or Firm* — Robert W Strozier

(57) ABSTRACT

Novel cathode, electrolyte and oxygen separation materials are disclosed that operate at intermediate temperatures for use in solid oxide fuel cells and ion transport membranes based on oxides with perovskite related structures and an ordered arrangement of A site cations. The materials have significantly faster oxygen kinetics than in corresponding disordered perovskites.

20 Claims, 20 Drawing Sheets

CATHODE AND ELECTROLYTE MATERIALS FOR SOLID OXIDE FUEL CELLS AND ION TRANSPORT MEMBRANES

RELATED APPLICATION

This application is a nationalization of PCT Application Serial No. PCT/US06/31234, filed 9 Aug. 2006, which claims priority to and the benefit of U.S. Provisional Patent Application Ser. No. 60/706,836 filed 9 Aug. 2005.

GOVERNMENTAL SPONSORSHIP

This invention was made with government support under DE-FC26-03NT41960 awarded by Department of Energy. The United States government has certain rights in the invention.

BACKGROUND OF THE INVENTION

1. Field of the Invention

This invention relates to novel cathode and electrolyte materials for intermediate temperature solid oxide fuel cells and ion transport membranes based on oxides having perovskite related structures and an ordered arrangement of A site cations.

More specifically, the present invention relates to a family of compositions including at least one compound having the general formula (I):

$$(ABO_3)_p(A'BO_{2+x})_q(A'O_{2+x})_r \qquad (I)$$

where p, q, and r are integers, x is a real number, A is a divalent metal, A' is a trivalent metal and B is a metal capable of ready conversion between its plus three oxidation state and its plus four oxidation state or mixtures or combinations of such metals and where the cathode compositions possess both oxygen ion diffusivity and electronic conductivity. Cathode compositions also find applications in ion transport oxygen separation membranes and cathode.

More specifically, the present invention also relates to a family of electrolyte compositions including at least one compound having the general formula:

$$(AB'O_3)_p(A'B'O_{2+x})_q(A'O_{2+x})_r \qquad (II)$$

where p, q, and r are integers, x is a real number, A is a divalent metal, A' is a trivalent metal and and B' is a non transition metal and where the electrolyte compositions is a pure ionic conductor. Electrolyte compositions can be used in chemical sensors.

More specifically, the present invention also relates to fuel cells and separation cells including a composition of formulas (I) and/or (II) and the methods for making and using same.

2. Description of the Related Art

Solid oxide fuel cells (SOFCs) have the promise to improve energy efficiency and to provide society with a clean energy producing technology. The high temperature of operation enables the solid oxide fuel cell to operate well with existing fossil fuels and to be used in combined heat and power applications or efficiently coupled with turbines, to give very high efficiency conversion of fuels to electricity. SOFCs are quiet and non-polluting and their inherent high efficiency leads to lower greenhouse gas emissions.

At present, solid oxide fuel cells operating at 1000° C. utilize a yttria stabilized zirconia electrolyte (YSZ), a lanthanum strontium manganite cathode, and a nickel-YSZ cermet anode. Cells are connected by a lanthanum strontium chromite bipolar plate. Various geometries for the cell design have been investigated, but the most developed is the Siemens-Westinghouse tubular configuration in which the YSZ electrolyte film (30-40 µm) is supported on a 1.5 m long tube of porous lanthanum strontium manganite. The Siemens-Westinghouse design has been demonstrated successfully at the 100 kW scale.

While the technology has been successfully established, costs remain too high to permit widespread introduction of SOFCs into the marketplace. Cost reduction requires both improvements in the properties of the materials, particularly the electrodes, and the development of inexpensive fabrication processes. Lowering the operating temperature has a significant impact on cost by allowing the use of less expensive materials in interconnects and heat exchangers. Lower temperatures also lead to an increase in the reliability of SOFC systems by reducing problems associated with thermal cycling and performance degradation due to inter-diffusion or reaction of the individual components. Intermediate temperature SOFCs in both planar and tubular configurations at the 3-10 kW scale, for distributed combined heat and power and for auxiliary power are currently being developed in the U.S. by several organizations.

Operation of SOFCs at intermediate temperatures (500-800° C.) requires new combinations of electrolyte and electrode materials that will provide both rapid ion transport across the electrolyte and electrode-electrolyte interfaces and efficient electrocatalysis of the oxygen reduction and fuel oxidation reactions.

Mixed ionic electronic conducting (MIEC) oxides are the major functional component of ion transport membranes (ITMs). ITMs operate at high temperature by catalyzing the dissociation and reduction of an oxygen molecule at one membrane surface followed by coupled transport of an oxygen ion and two electron holes through the bulk material. On the second surface, the oxide ion acts as an oxidant for the catalyzed reaction of hydrocarbons such as methane to form synthesis gas or recombines to give molecular oxygen releasing electrons back into the membrane. In the latter case, the membrane functions as a high temperature oxygen separation device. Ion transport membrane systems are simpler in design than SOFCs in that no external circuit is required, but at the same time the materials requirements are very demanding because of the large gradient in oxygen activity across the membrane. The overall performance of an ITM is determined by the bulk transport and surface reactions which are strongly coupled together.

Thus, there is a need in the art for a new class of materials that will allow SOFCs and ITMs to operate at intermediate temperatures.

SUMMARY OF THE INVENTION

This invention provides a new class of cathode compositions having superior properties for oxygen reduction that are suitable for use at intermediate temperatures in a range between about 400° C. and about 800° C.

This invention provides a new class of electrolyte compositions having superior properties at intermediate temperatures in a range between about 400° C. and about 800° C.

The invention also provides a new class of membrane forming composition having superior properties for use in oxygen separation.

These compositions solve the problem of reducing operating costs because the compounds in the compositions allow operation of SOFCs and ITMs at intermediate operating temperatures in a range between about 400° C. and about 800° C.

This invention provides a class of perovskite oxides cathode compositions including at least one compound having the general formula (I):

where p, q, and r are integers, x is a real number, A is a divalent metal, A' is a trivalent metal cation and B is a transition metal cation or mixtures or combinations of transition metals and where the cathode compositions have unusually large oxygen ion diffusion coefficients making them ideally suitable as electrodes for intermediate temperature solid oxide fuel cells and ion transport membranes for oxygen separation. The value of p generally ranges from 1 to about 4. When the value of p is 4, then the value of q ranges from 1 to 4 and the value of r ranges from 0 to 4, i.e., p≥q (p is greater than or equal to q) and q≥r (q is greater than or equal to r) requiring that p≥r (p is greater than or equal to r). In certain embodiments, the compositions are defined as having p>q (p is greater than q), q>r (q is greater than r), which requires that p>r (p is greater than r). In other embodiments, p is greater than 4, which of course enlarges the corresponding ranges of q and r. The value of x is a real number having a range greater than 0.0 and less than 1.0, i.e., 0.0<x<1.0.

This invention provides a class of perovskite oxides electrolyte compositions including at least one compound having the general formula (II):

where p, q, and r are integers, x is a real number, A is a divalent metal, A' is a trivalent metal cation and B' is a non transition metal or mixtures or combinations thereof making them ideally suitable for electrolytes that are capable of efficient operation in intermediate temperature solid oxide fuel cells. The value of p generally ranges from 1 to about 4. When the value of p is 4, then the value of q ranges from 1 to 4 and the value of r ranges from 0 to 4, i.e., p≥q (p is greater than or equal to q) and q≥r (q is greater than or equal to r) requiring that p≥r (p is greater than or equal to r). In certain embodiments, the compositions are defined as having p>q (p is greater than q), q>r (q is greater than r), which requires that p>r (p is greater than r). In other embodiments, p is greater than 4, which of course enlarges the corresponding ranges of q and r. For a single non-transition metal having a plus three oxidation state, e.g., $Al^{3+}$, x is exactly equal to 0.5. To permit x to vary in the range between x having a value greater than 0.0 and less than 1.0, i.e., 0.0<x<1.0, the composition includes a mixture of trivalent non-transition metals and tetravalent non-transition elements, e.g., $Al^{3+}$ and $Ti^{4+}$. The compounds of formula (II) having x in the range between 0.0>x<1.0 are generally formed by alio valent doping, a process where some trivalent metals are related by tetravalent metals.

The present invention provides a fuel cell including a hydrogen reservoir in contact with an anode comprising a known anode composition, an oxygen reservoir in contact with a cathode comprising a composition including at least one compound of formula (I) and an electrolyte interposed therebetween comprising a composition including a compound of formula (II) or a traditional or known fuel cell electrolytic material.

The present invention provides an oxygen enrichment apparatus including an oxygen containing gas reservoir and an oxygen reservoir with an oxygen diffusion membrane comprising a composition including at least one compound of formula (I) interposed therebetween.

BRIEF DESCRIPTION OF THE DRAWINGS

The invention can be better understood with reference to the following detailed description together with the appended illustrative drawings in which like elements are numbered the same.

LIST OF ACRONYMS AND ABBREVIATIONS OF THE INVENTION

The term CGO means Cerium Gadolinium Oxide.
The term ECR means Electrical Conductivity Relaxation.
The term EPMA means Electron Probe MicroAnalysis.
The term GDC means Gadolinia Doped Ceria (see CGO).
The term LSGM means Lanthanum Strontium Magnesium Gallate.
The term PLD means Pulsed Laser Deposition.
The term TGA means Thermogravimetric Analysis.
The term YSZ means Yttria Stabilized Zirconia.
The term IEDP means Isotope Exchange and Depth Profiling.
The term PBCO means Praesodymium Barium Cobalt Oxide.
The term STO means Strontium Titanate.
The term LAO means Lanthanum Aluminate.

DETAILED DESCRIPTION OF THE INVENTION

The inventors have found that a new class of perovskite oxides can be constructed that have enhanced oxygen diffusivity and conductivity properties ideally suited for use in intermediate temperature fuel cells and intermediate temperature oxygen membrane separation applications and other similar applications. The inventors have also found that a new class of perovskite oxides can be constructed for use as an electrolyte for use in intermediate temperature fuel cell applications by changing the readily convertable trivalent metal ions (readily convertible between their plus three oxidation state and their plus four oxidation state, i.e., $M^{3+} \leftrightarrow M^{4+}$) in the lattice of the perovskite oxides described above to metal ions that are not readily convertible between their plus three and plus four oxidation states.

Figure 1A:
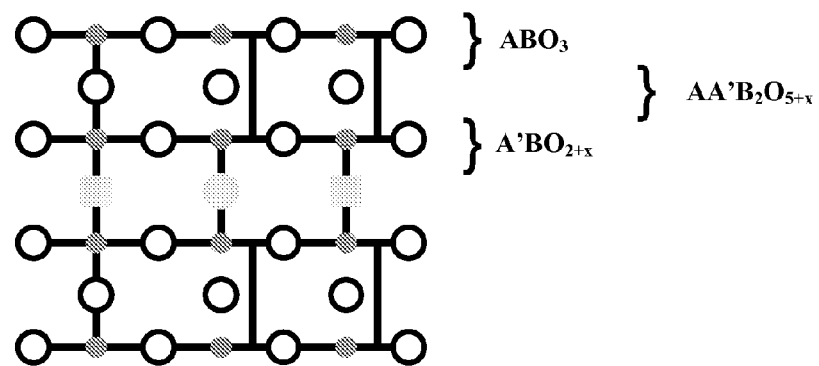
FIG. 1A depicts a front view of the structure of a compound of formula (I), where p=q=1 and r=0 and where the white spheres are oxygen lattice sites, the dark gray sphere are B metal lattice sites, the gray spheres are partially filled oxygen ion lattice sites and the grey square are unfilled oxygen lattice sites (A and A' are not shown as these atoms are either in front or behind shown sites)
Figure 1B:
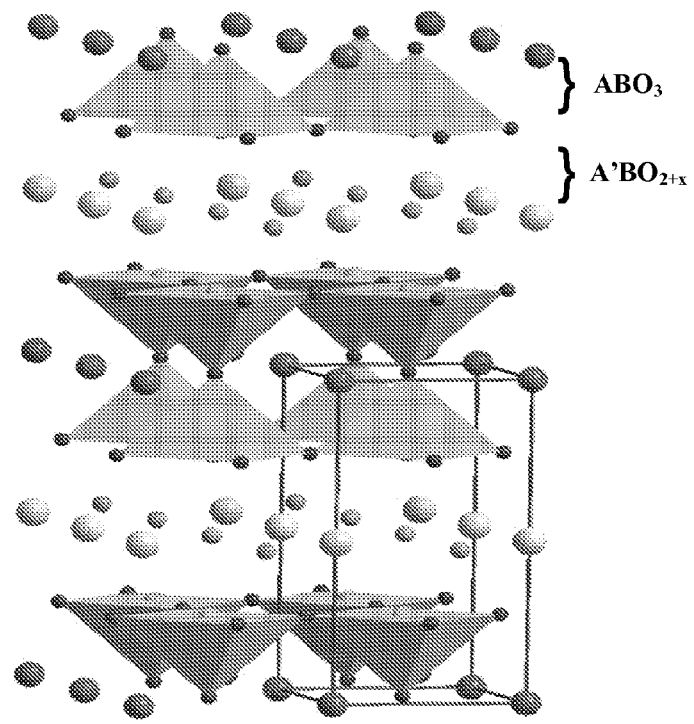
FIG. 1B depicts a perspective view of structure of FIG. 1A, where the black represent the barium cations (A) and light gray spheres represent praseodymium cations (A'), the square pyramidal coordination represent cobalt ions (B) with the small black sphere representing oxygen lattice sites, and the small dark gray spheres represent partially occupied oxygen ion sites.
Figure 1C:
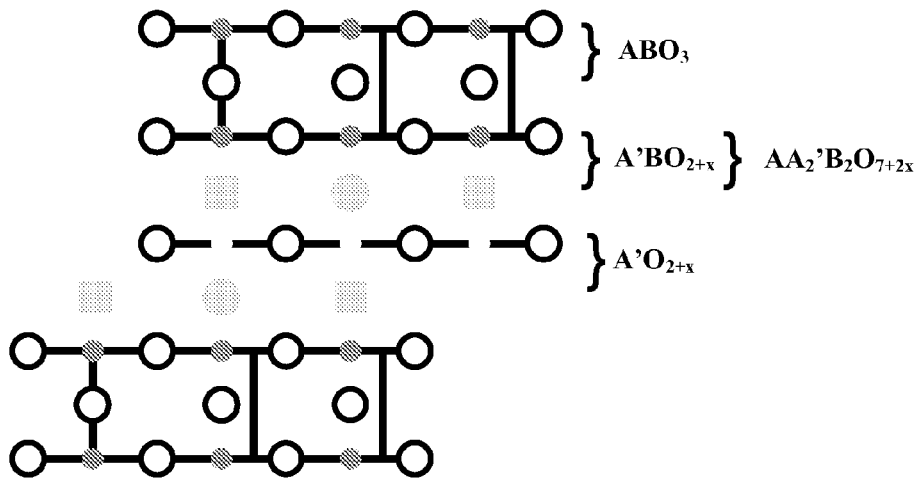
FIG. 1C depicts a front view of the structure of a compound of formula (I), where p=q=r and where the red spheres are oxygen lattice sites, the blue sphere are B metal lattice sites, the gray spheres are partially filled oxygen ion lattice sites and the squares unfilled oxygen lattice sites (A and A' are not shown as these atoms are either in front or behind shown sites)
Figure 1D:
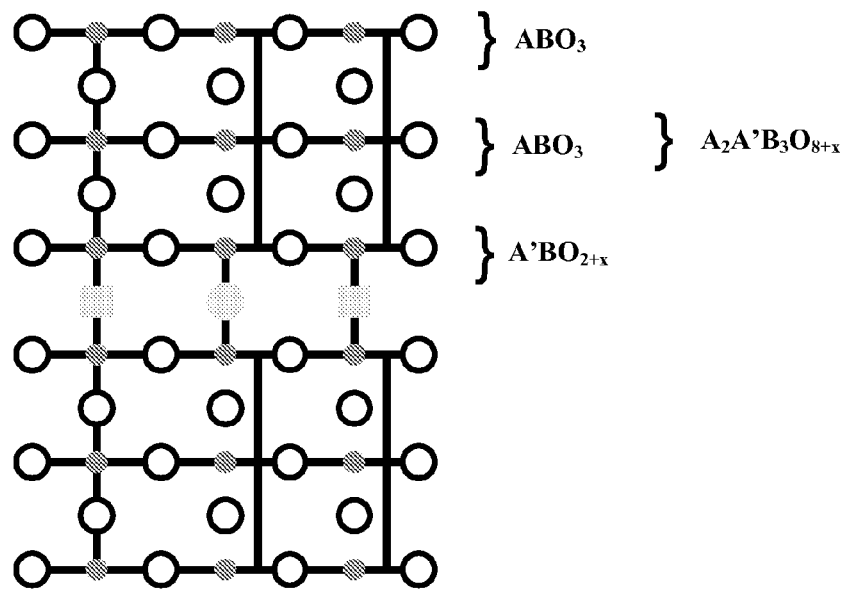
FIG. 1D depicts a front view of the structure of a compound of formula (I), where p=2, q=1, and r and where the red spheres are oxygen lattice sites, the blue sphere are B metal lattice sites, the gray spheres are partially filled oxygen ion lattice sites and the squares unfilled oxygen lattice sites (A and A' are not shown as these atoms are either in front or behind shown sites)

The inventors have found that particular perovskite oxides with ordered A cations which, in turn, localize the oxygen vacancies into layers can be constructed with improved conductivity and oxygen diffusivity in an intermediated temperatures range between 400° C. and 800° C. One member of this class of compounds has the general formula:

$$AA'B_2O_{5+x}$$

where A'=Ba, and A=Y, or a trivalent lanthanide ion, and B is a first row transition metal ion, excluding Sc, Ti and Zn. The ideal structure of this family of compounds is generated by a stacking sequence: . . . |A'O|BO$_2$|AO$_x$|BO$_2$| . . . , to form structures closely related to the cuprate superconductors. The vacant sites are arranged so that when x=0, the A cation is eight coordinate. The structure of PrBaCo$_2$O$_5$, (PBCO), a member of this new class of perovskite oxides is shown in FIGS. 1A&B.

The ordered vacancies in these materials are thought to cause a great enhancement in the diffusivity of oxide ions in the bulk of the material and may supply surface defect sites with enhanced reactivity towards molecular oxygen. The low temperature structural properties of these compounds have been studied in detail (W. Zhou, C. T. Lin, W. Y. Liang, Adv. Mater. 5 1993 735; I. O. Troyanchuk, N. V. Kasper, D. D. Khalyavin, H. Szymczak, R. Szymczak, M. Baran, Phys. Rev. Lett. 80 1998 3380; A. Maignan, C. Martin, D. Pelloquin, N. Nguyen, B. Raveau, J. Solid State Chem. 142 1999 247; P. S. Anderson, C. A. Kirk, J. Knudsen, I. M. Reaney, A. R. West, Solid State Sciences 7, 2005, 1149; and S. Streule, A. Podlesnyak, J. Mesot, M. Medarde, K. Conder, E. Pomjakushina, E. Mitberg and V. Kozhevnikov J. Phys.: Condens. Matter 17, 2005, 3317), but little is known concerning their high temperature oxygen chemistry.

The inventors have also found that measurements of the surface oxygen exchange kinetics and bulk oxide ion diffusion coefficients for LnBaCo$_2$O$_{5+x}$ (Ln=Pr, Nd) by isotope exchange and depth profiling (IEDP) and electrical conductivity relaxation (ECR) indicate that these materials are ideally suited for use as intermediate temperature cathode materials for fuel cell application, as intermediate temperature electrolyte materials and as intermediate temperature oxygen separation materials. Both techniques demonstrate that the oxygen kinetics in these structure type are significantly faster than in corresponding disordered perovskites.

The compositions of this invention for use as cathode materials and oxygen diffusion materials broadly comprise at least one compound having the general formula (I):

$$(ABO_3)_p(A'BO_{2+x})_q(A'O_{2+x})_r \qquad (I)$$

where the compounds has a perovskite oxide structure, p, q, and r are integers, x is a real number, A is a divalent metal cation, A' is a trivalent metal cation and B is a transition metal cation or mixtures or combinations thereof. The A' trivalent metal cations are convertible into their tetravalent state accounts for x being a real number. The value of p generally ranges from 1 to about 4, but higher values are possible. When the value of p is 4, then the value of q ranges from 1 to 4 and the value of r ranges from 0 to 4, i.e., p≥q and q≥r requiring that p≥r. In certain embodiments of the compositions, p is greater than q, a q is in turn greater than r requiring p to be greater than r (p>q, q>r and p>r). In certain other embodiments, p is greater than 4, which in turn enlarges the corresponding ranges of q and r. The value of x ranges form a real number greater than 0.0 and less than 1.0, i.e., 0.0<x<1.0, which is controlled by the amount of A' metals that are converted from their plus three state to their plus four state or visa versa. The compositions are capable of lowering the operating temperature of fuel cells from the current operating temperatures which are above 800° C. to an intermediate temperature between about 400° C. and about 800° C. In certain embodiments, the operating temperature is between about 400° C. and about 700° C. In other embodiments, the operating temperature is between about 400° C. and about 600° C. In other embodiments, the operating temperature is between about 450° C. and about 800° C. In other embodiments, the operating temperature is between about 450° C. and about 700° C. In other embodiments, the operating temperature is between about 450° C. and about 600° C.

The compositions of this invention for use as cathode materials and oxygen diffusion materials broadly comprise at least one compound having the general formula (I):

$$(AB'O_3)_p(A'B'O_{2+x})_q(A'O_{2+x})_r \qquad (I)$$

where the compounds has a perovskite oxide structure, p, q, and r are integers, x is a real number, A is a divalent metal, A' is a trivalent metal cation and B' is a non transition metal or mixtures or combinations thereof for electrolyte compositions. The value of p preferably ranges from 1 to about 4. When the value of p is 4, then the value of q ranges from 1 to 4 and the value of r ranges from 0 to 4, i.e., p≥q and q≥r requiring that p≥r. In preferred compositions, p is greater than q which is in turn greater than r requiring p to be greater than r. Although p preferably ranges from 1 to 4, p can be greater than 4, which of course enlarges the corresponding ranges of q and r. The value of x ranges form a real number greater than 0.0 and less than 1.0, i.e., 0.0<x<1.0. The compositions are capable of lowering the operating temperature of fuel cells from the current operating temperatures which are above 800° C. to an intermediate temperature between about 400° C. and about 800° C. In certain embodiments, the operating temperature is between about 400° C. and about 700° C. In other embodiments, the operating temperature is between about 400° C. and about 600° C. In other embodiments, the operating temperature is between about 450° C. and about 800° C. In other embodiments, the operating temperature is between about 450° C. and about 700° C. In other embodiments, the operating temperature is between about 450° C. and about 600° C.

The compounds are comprised of three distinct building blocks: $ABO_3$, $A'BO_2$, and $A'O_{2+x}$ which are combined in different ways to give the various compounds of the invention according to the following rules: p≥q and q≥r. Examples are given in Table 1.

TABLE 1

Examples of Compositions of the Present Invention

| p | q | r | Composition |
|---|---|---|---|
| 1 | 1 | 0 | $AA'B_2O_{5+x}$ |
| 1 | 1 | 1 | $AA'_2B_3O_{7+x}$ |
| 2 | 1 | 0 | $A_2A'B_3O_{8+x}$ |

The structural arrangements of the building blocks are shown in FIGS. 1A-D for the three examples of compounds of Formula (I) in Table 1. As a consequence of the structural arrangement, the A and A' cations occupy separate layers, that is they are ordered, but not shown, except in the perspective drawing of FIG. 1B. The oxygen vacancies are thereby confined into layers and it is this feature that is responsible for the high oxygen diffusivity.

The divalent metal cation suitable for use in the compounds of this invention suitable for cathodes and oxygen diffusion membranes include, without limitation, barium (Ba), strontium (Sr) or lead (Pb) or mixtures or combinations thereof, while the trivalent metal is, without limitation, yttrium (Y) or a trivalent lanthanide element including lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu) or mixtures or combinations thereof. In cathode or ion transport membrane applications, electronic conductivity is required in addition to ionic conductivity in this case the B cation is chosen from the first transition series of elements excluding titanium or mixtures of combinations thereof. In certain embodiments, the B cation is manganese, iron, cobalt and nickel or mixtures or combinations thereof. In other embodiments, A=barium (Ba) and A'=yttrium (Y), lanthanum (La), praseodymium (Pr), neodymium (Nd), samarium (Sm) or mixtures or combinations thereof and B=iron (Fe), cobalt (Co), or mixtures or combinations thereof. Exemplary examples of compounds of formula (I) are $PrBaCo_2O_{5.5+x}$, $PrBaFe_2O_{5.5+x}$, $NdBaCo_2O_{5.5+x}$, and $NdBaFe_2O_{5.5+x}$.

Electronic conductivity is detrimental to electrolyte applications and consequently in this situation compounds of formula (II) are utilized in the composition with B' being a non-transition metal or titanium. In certain embodiments, B' is magnesium (Mg), zinc (Zn), aluminum (Al), gallium (Ga), scandium (Sc), titanium (Ti) and germanium (Ge) or mixtures or combinations thereof.

Synthesis and Processing

The compounds of this invention can be synthesized in polycrystalline form via a citrate precursor method. The resulting powders are densified by first pressing into a 1-inch diameter die followed by cold isostatic pressing (CIP). The green disk is sintered in air and then cooled down slowly in nitrogen. Other variants of this synthesis procedure may be employed to synthesize the compounds of this invention, including solid state reaction, spray pyrolysis, freeze drying and sol-gel techniques.

The compounds of the invention can be converted to porous thin or thick films by spraying, painting, or screen printing inks of small particles in a suitable binder. Alternatively, physical vapor deposition methods, including pulsed laser deposition, sputtering, chemical vapor deposition, photo-assisted chemical vapor deposition, aerosol assisted chemical vapor deposition, atomic layer deposition, may be used to produce dense or porous films on electrolyte substrates or dense films on porous supports for ion transport membranes.

EXPERIMENTAL SECTION OF THE INVENTION

The following examples and analytical measurements are included for the sake of the completeness of the disclosure and to illustrate the present invention, but in no way are these examples and analytical measurement included for the sake of limiting the scope or teaching of this invention.

Example 1

This example illustrates the synthesis of $PrBaCo_2O_{5+x}$ and $NdBaCo_2O_{5+x}$ via a citrate precursor method. Stoichiometric amounts of $Pr_6O_{11}$ (Alfa 99.99%) or $Nd(NO_3)_2$, and barium and cobalt nitrates (Aldrich, 99.99%), were dissolved in dilute nitric acid. Ethylene glycol (EM science >98%) and citric acid (Aldrich, 99.5%) were added to the solution. This mixtures were covered and stirred at 150° C. until the solutions began to foam and formed dry resins. Further heating at 300° C. and then 600° C. for 24 hours decomposed the dry foams containing residual organic components. The final mixtures were pressed into pellets and sintered in air at 1100° C. for 12 hours and the cooled to room temperature in a nitrogen atmosphere. X-ray diffraction patterns of the final products confirmed the formation of single phases of $PrBaCo_2O_{5+x}$ and $NdBaCo_2O_{5+x}$.

Example 2

Figure 2:
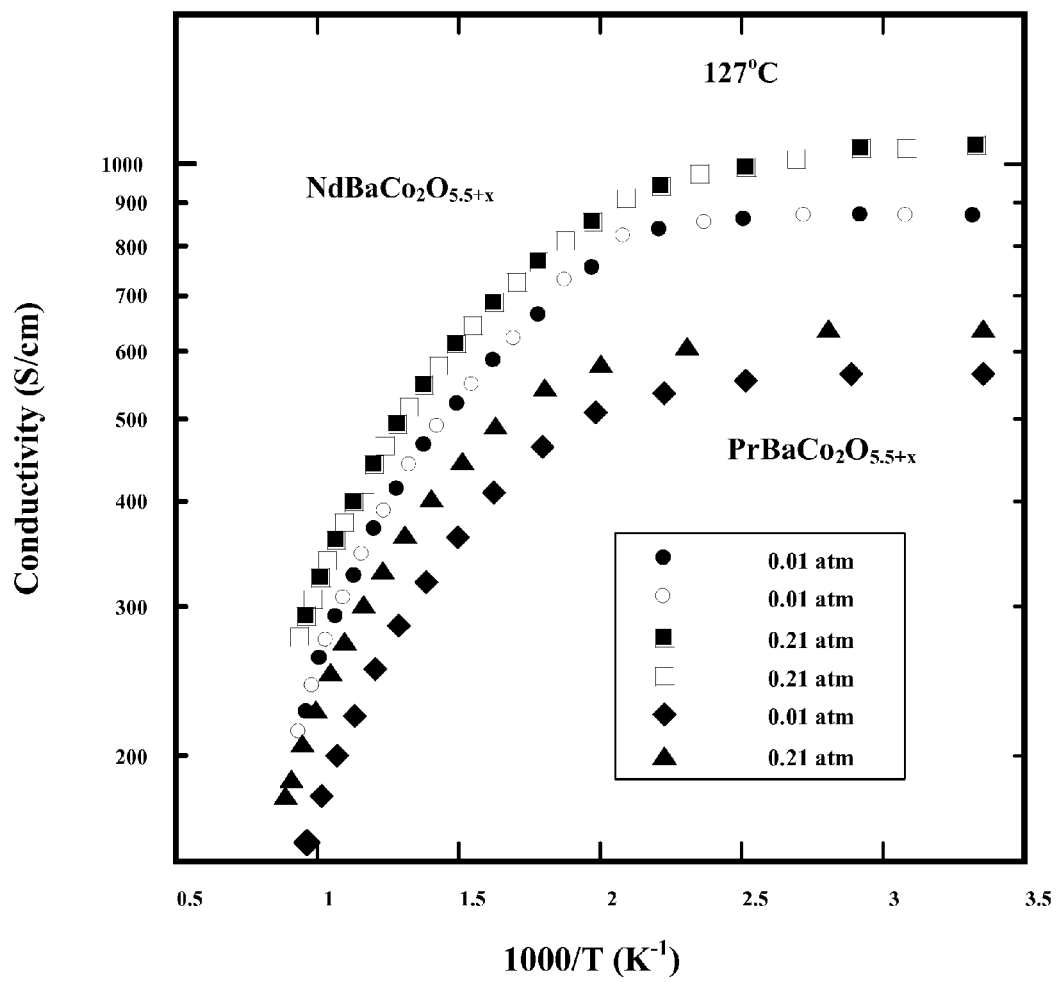
FIG. 2 depicts the DC conductivity of $PrBaCo_2O_{5.5+x}$ and $NdBaCo_2O_{5.5+x}$.

This example shows the variation of the DC conductivity of $PrBaCo_2O_{5.5+x}$ and $NdBaCo_2O_{5.5+x}$. The total conductivity was measured by the 4-probe method at $pO_2$=0.01 and 0.21 atm in the range 25° C.≤T° C.≤812° C. The measurements were made AC at a single frequency (1 kHz) using a dual-phase lock-in amplifier (Stanford Instruments Model SR830). The total conductivity was measured on rectangular bars of $PrBaCo_2O_{5.5+x}$ (1.3×0.19×0.15 cm) and $NdBaCo_2O_{5.5+x}$ (1.4×0.2×0.21 cm). Near ambient temperature, the conductivities reach 600 $Scm^{-1}$ and 1000 $Scm^{-1}$ for the Pr and Nd compounds, respectively (FIG. 2). As the temperature is increased, the conductivities begin to decrease at ~150° C. due to the loss of oxygen atoms from the lattices and reduction of Co(IV) to Co(III). The data indicate that the onset temperature for oxygen loss is slightly lower for the Nd compound. The occurrence of oxygen loss at such low temperature indicates that the high mobility of oxygen ions in these phases.

Example 3

Figure 3:
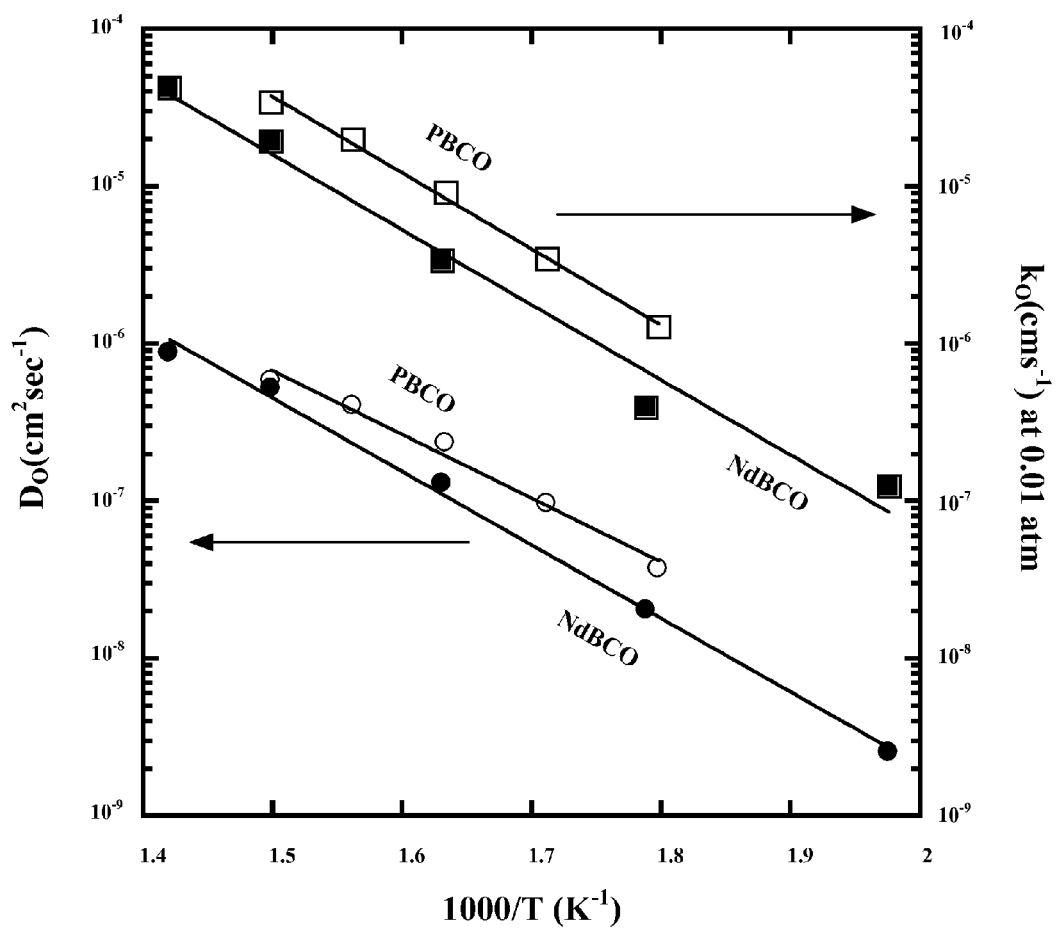
FIG. 3 depicts the oxygen diffusion and surface exchange coefficients for $PrBaCo_2O_{5.5+x}$ and $NdBaCo_2O_{5.5+x}$.

This example shows the high value of the oxygen transport kinetics in of $PrBaCo_2O_{5.5+x}$ and $NdBaCo_2O_{5.5+x}$ by measurement of the diffusion coefficient and surface exchange coefficient by electrical conductivity relaxation in the temperature range between about 300° C. and about 450° C. The measurements were made AC at a single frequency (1 kHz) using a dual-phase lock-in amplifier (Stanford Instruments Model SR830). Measurements were made with an abrupt gas switch on both oxidation and reduction and were performed twice at each gas switch and temperature. The self diffusion coefficients and surface exchange coefficients are shown in FIGS. 2 and 3. These values are remarkably high at such low temperature in comparison with other materials.

Example 4

Synthesis of PBCO $PrBaCo_2O_{5+x}$ (PBCO) was synthesized via a citrate precursor method (L. W. Tai, P. A. Lessing, J. Mater. Res. 7, 1992, 511). Stoichiometric amounts of $Pr_6O_{11}$ (Alfa 99.99%) and barium and cobalt nitrates (Aldrich, 99.99%), were dissolved in dilute nitric acid. Ethylene glycol (EM science, >98%) and citric acid (Aldrich, 99.5%) were added to the solution. This mixture was covered and stirred at 150° C. until the solution began to foam and formed a dry resin. Calcination for 24 h each at 300° C. and then 600° C. decomposed the remaining organic components in the foam. The final mixture was pressed into pellets in a 1-inch diameter die followed by cold isostatic pressing (CIP). The pellet was sintered in air at 1100° C. for 12 h and then cooled down slowly (2K/min.) in nitrogen. The bulk density, measured by the Archimedes method, was 90% of the theoretical value. Rectangular-shaped bars (~2 mm×2 mm×10 mm) for conductivity/ECR measurements were cut from the disks along with 4 mm×4 mm rectangular plates suitable for IEDP.

Experimental Techniques Used to Characterization PBCO

X-ray powder diffraction measurements (Scintag XDS 2000, Cu Kα) were performed to confirm the structure and the powder pattern was analyzed by Rietveld refinement using the GSAS program (Larson, R. B. Von Dreele, Los Alamos Laboratory Rep. No La-UR-86-748 1987). A scan rate of 0.125°/min. was used with the range 5°≤2θ≤90°. Thermogravimetric (TA Instruments 2950) determination of the equilibrium oxygen stoichiometry as a function of temperature in (dry) oxygen partial pressure atmospheres was obtained within the range of $0.01 \leq pO_2 \leq 0.21$ atm and 25° C.≤T≤800° C. The samples were first heated to 800° C. to remove any traces of water or surface carbonate, cooled to 25° C. at 1° C./min. and then reheated to 800° C. Thermodynamic factors, $G_O$, required for comparison of ECR and IEDP measurements, were derived from the thermogravimetric data according to equation (1):

$$\Gamma_o = \frac{\partial \ln a_o}{\partial \ln c_o} = \frac{1}{2}\frac{\partial \ln pO_2}{\partial \ln c_{o^{2-}}} \quad (1)$$

Transport Measurements (ECR and IEDP)

The total conductivity was measured by the 4-probe method at $pO_2$=0.01 and 0.21 atm in the range 25° C.≤T≤812° C. The measurements were made AC at a single frequency (1 KHz) using a dual-phase lock-in amplifier (Stanford Instruments Model SR830). Data acquisition and control were performed with the Labview (National Instruments) program. Conductivity transients were measured in duplicate at various temperatures and for various oxygen partial pressure changes, which were performed both as oxidation and reduction transients. The transient response yields the surface ($k_{chem}$) and bulk ($D_{chem}$) contributions to the rate of chemical (oxygen) stoichiometry change during the transient (see S. Wang, A. Verma, Y. L. Yang, A. J. Jacobson, B. Abeles, Solid State Ionics 140, 2001, 125).

The transport rates of oxygen were also directly measured by $^{18}O$ IEDP (see. e.g., J. A. Kilner, B. C. H Steele, L. Ilkov, Solid State Ionics 12, 1984, 89 and C. A. Mims, N. I. Joos, P. A. W. van der Heide, A. J. Jacobson, C. L. Chen, C. W. Chu, B. I. Kim, S. S. Perry, Electrochemical and Solid State Letters, 3, 2000, 59). Rectangular samples were placed on a supporting quartz rod and inserted into a quartz reactor tube held in a tube furnace and purged by flowing oxygen (0.2 atm). The temperature was slowly (<5° C./min.) raised to the experimental temperature and held there for at least one hour, after which the gas atmosphere was rapidly switched to $^{18}O_2$ (0.2 atm, 99% isotopic abundance) and then rapidly quenched by withdrawing the support rod and sample from the reactor. Imaging time-of-flight SIMS (ToFSIMS) analyses of both the exposed surfaces and polished cross-sections of the infused materials were used to determine the resulting $^{18}O$ profile. Analysis chamber pressures less than $1 \times 10^{-9}$ mbar were enforced during the SIMS analysis to avoid oxygen exchange with background gases. Values for the surface oxygen exchange coefficient, $k_O$, and the bulk oxygen self-diffusion coefficient, $D_O$, were obtained by fitting simulated profiles to the experimental data. The relationship between the transport parameters obtained by the IEDP and ECR is given by (k or D)$_{chem}$ (ECR)/$G_O$=(k or D)$_O$ where $G_O$ is the thermodynamic factor defined above.

Electrode Measurements

Area specific resistances of PBCO, ceria-gadolinia (CGO) composite electrodes on CGO were determined by AC impedance measurements using symmetric cells. The measurements were made in air as a function of temperature using a Solatron 1260 impedance analyzer. Contacts were made with gold grids and wire.

Results of the Characterization of PBCO

X-Ray Diffraction

Figure 4:
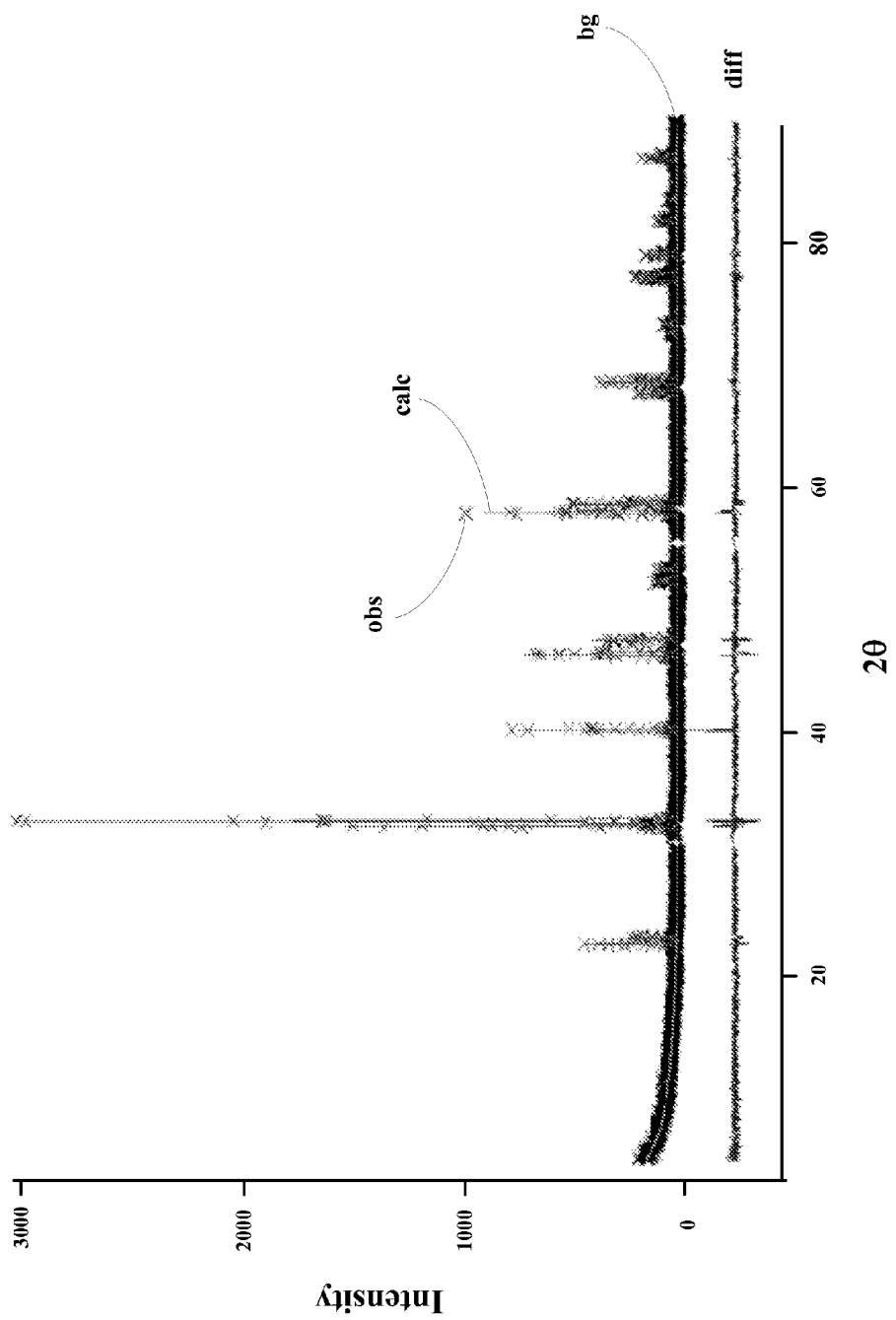
FIG. 4 depicts an X-Ray diffraction pattern with Rietveld refinement of $PrBaCo_2O_{5+x}$ with cell parameters, a=3.9084(1) Å, b=3.9053(1) Å, c=7.6343(2) Å.

The compounds were shown to be single phase by X-ray powder diffraction. Each powder pattern was indexed to an orthorhombic unit cell (Space group=Pmmm) and refined using the Rietveld method with GSAS program. FIG. 4 shows the diffraction data along with the resulting fit and difference pattern. The unit cell parameters a=3.9084(1)Å, b=3.9053(1) Å, c=7.6343(2)Å determined for PBCO are in agreement with previous studies of materials cooled in air (see, e.g., P. S. Anderson, C. A. Kirk, J. Knudsen, I. M. Reaney, A. R. West, *Solid State Sciences* 7, 2005, 1149; S. Streule, A. Podlesnyak, J. Mesot, M. Medarde, K. Conder, E. Pomjakushina, E. Mitberg and V. Kozhevnikov *J. Phys.: Condens. Matter* 17, 2005, 3317; and C. Frontera, A. Caneiro, A. E. Carrillo, J. Oró-Solé, J. L. Garcia-Muñoz, *Chem. Mater.* 17, 2005, 5439) and indicate a value of x near 0.7. The near-tetragonal symmetry (a/b=1.0008) is also consistent with observations near this stoichiometry (see, e.g., S. Streule, A. Podlesnyak, J. Mesot, M. Medarde, K. Conder, E. Pomjakushina, E. Mitberg and V. Kozhevnikov *J. Phys.: Condens. Matter* 17, 2005, 3317 and C. Frontera, A. Caneiro, A. E. Carrillo, J. Oró-Solé, J. L. Garcia-Muñoz, *Chem. Mater.* 17, 2005, 5439).

Thermogravimetric Analysis

Figure 5:
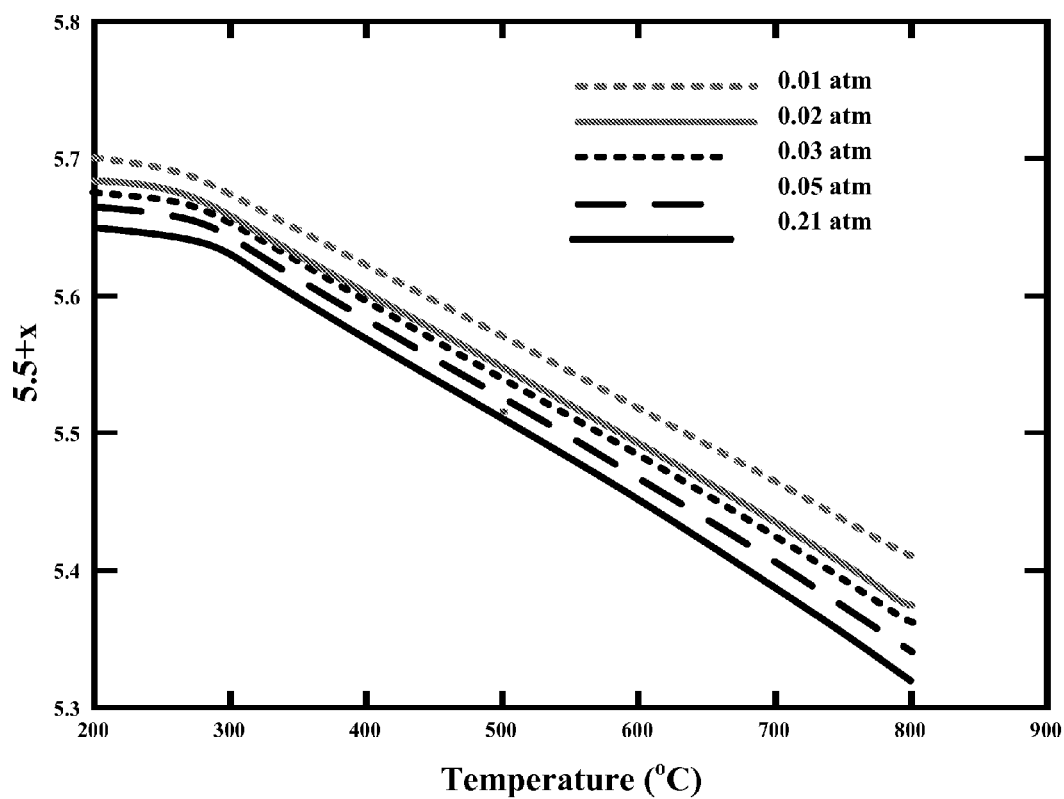
FIG. 5 depicts thermogravimetric data for $PrBaCo_2O_{5+x}$ showing oxygen stoichiometry as a function of temperature at the oxygen partial pressures indicated.

The thermogravimetric data in FIG. 5 shows the average oxygen stoichiometry as a function of temperature in various oxygen atmospheres. Data obtained on heating and cooling are in good agreement and the changes in stoichiometry are reversible at temperatures above 300° C.

Figure 6:
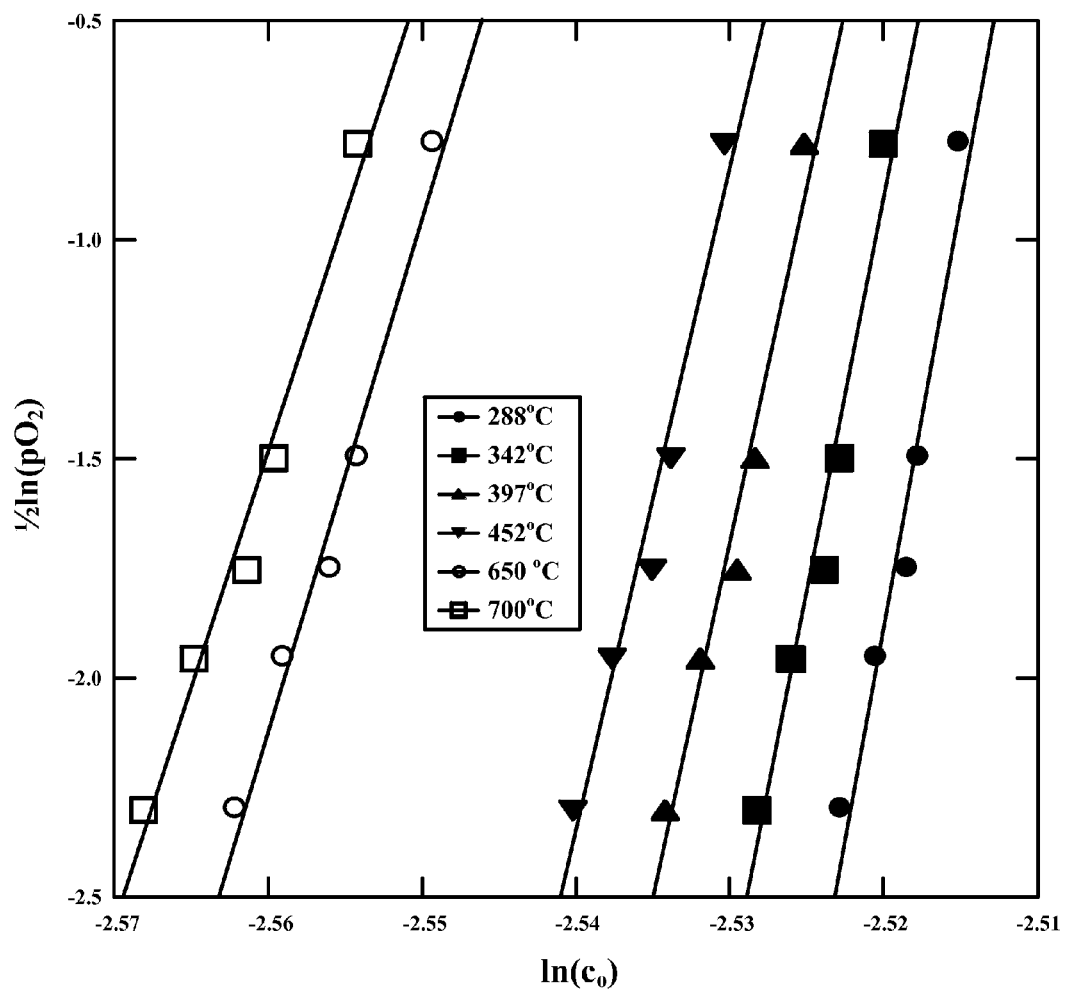
FIG. 6 depicts Variation of the oxygen partial pressure with the oxygen atom concentration ($c_O$) in PBCO at various temperatures.

The dependence of the oxygen partial pressure on the oxygen concentration in the solid at the various temperatures used in the ECR measurements is shown in FIG. 6. The lines shown in this panel provide the best average value of the thermodynamic factor, $G_O$. These values are summarized in Table 2. As temperature is increased, the values of the thermodynamic factor become smaller. Some curvature in these plots is suggested in the FIG. 6, indicating a variation in $G_O$ with oxygen pressure.

TABLE 2

Summary of the Thermodynamic Factors for $PrBaCo_2O_{5.5+x}$ DC Conductivity

| Temperature (° C.) | $G_O$ |
|---|---|
| 288 | 193(26) |
| 342 | 179(22) |
| 397 | 162(19) |
| 452 | 150(17) |
| 650 | 116(10) |
| 700 | 107(9) |

Figure 7:
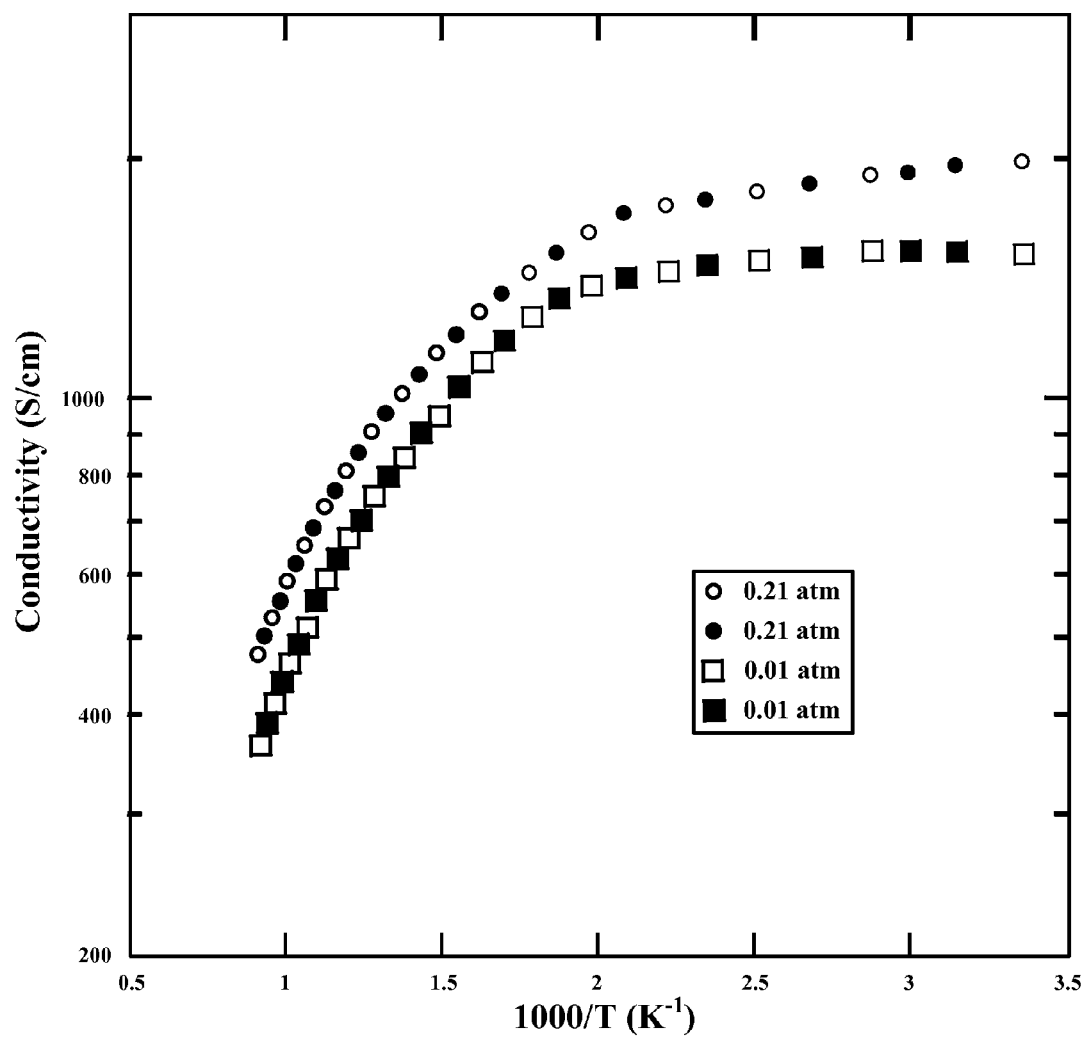
FIG. 7 depicts Total conductivity of $PrBaCo_2O_{5.5+x}$ at 0.01 (■) and 0.21 (●) atm, open and closed symbols correspond to measurements on heating and cooling.

The total conductivity was measured on a rectangular bar of $PrBaCo_2O_{5+x}$ (1.3×0.19×0.15 cm). Near ambient temperature, the conductivities reaches 2000 $Scm^{-1}$ as shown in FIG. 7 and as the temperature is increased, the conductivity begins to decrease at ~150° C. due to the loss of oxygen atoms from the lattice and reduction of Co(IV) to Co(III).

Transport Parameters (ECR and IEDP)

Figure 8:
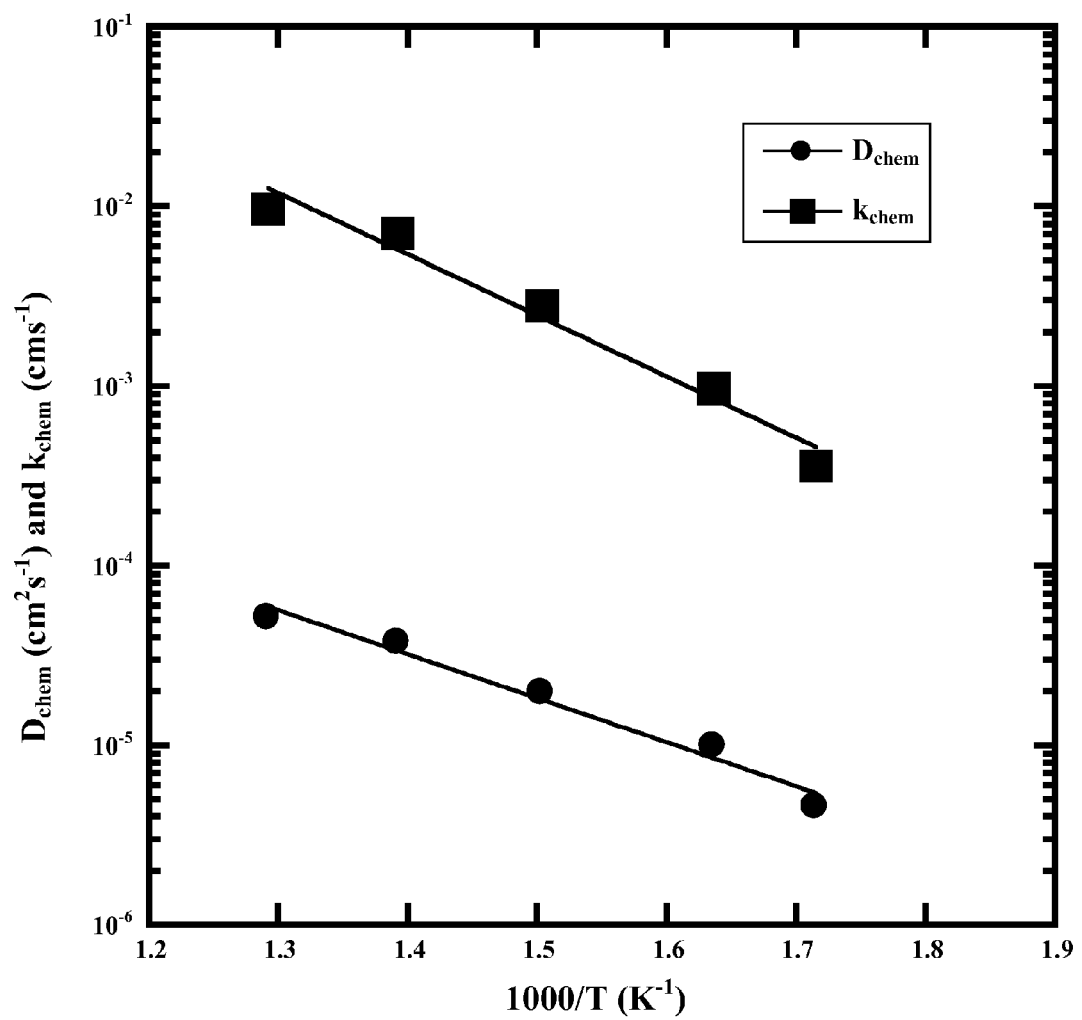
FIG. 8 depicts The temperature dependences of $D_{chem}$ and $k_{chem}$ measured by ECR for $PrBaCo_2O_{5+x}$.
Figure 10:
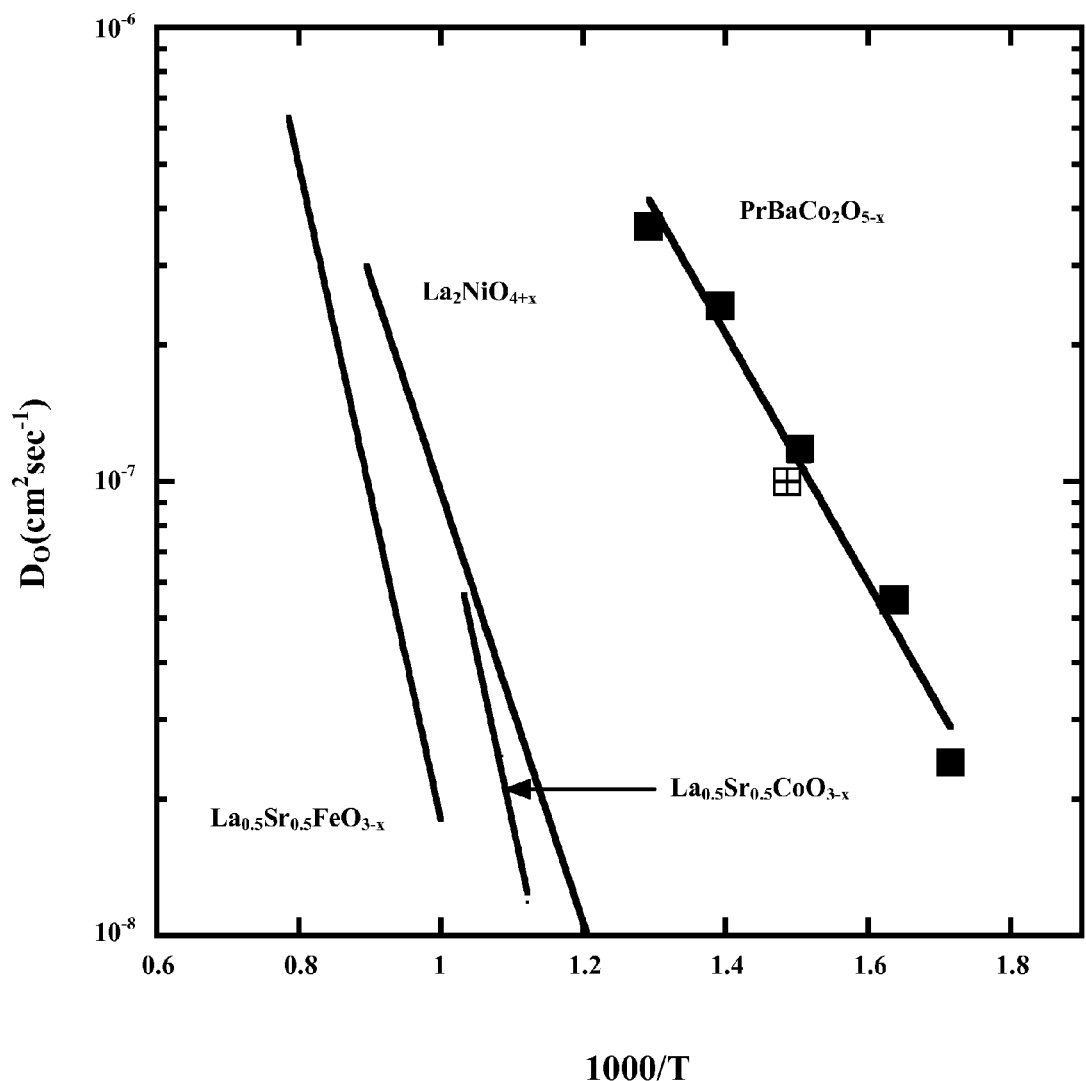
FIG. 10 depicts Comparison of the values of $D_O$ measured by ECR for ceramic samples
Figure 11:
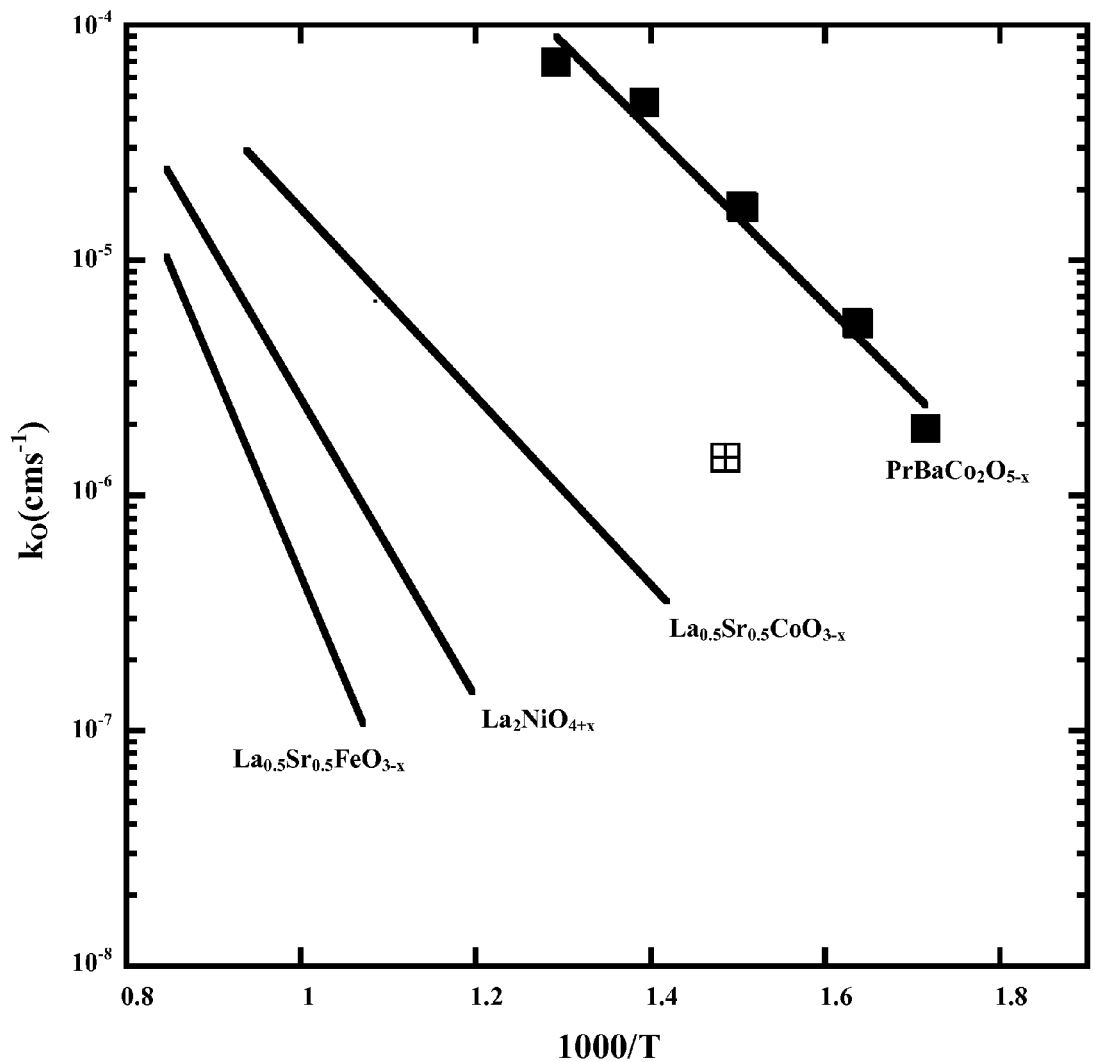
FIG. 11 depicts Comparison of the values of $k_O$ measured by ECR for ceramic samples

The diffusion coefficients and surface exchange coefficients measured for $PrBaCo_2O_{5+x}$ are shown in FIG. 8. The upper panel shows the values of $D_{chem}$ and $k_{chem}$ derived directly from the ECR measurements. Fits to the Arrhenius equation provide activation energies of 0.48 eV and 0.67 eV for $D_{chem}$ and $k_{chem}$, respectively. The values of the oxygen transport parameters $D_O$ and $k_O$ derived from the ECR data using the values of $G_O$ are shown in FIGS. 10 and 11. Also shown in FIGS. 10 and 11 are the values of D and k obtained directly from the IEDP measurements.

Figure 9A:
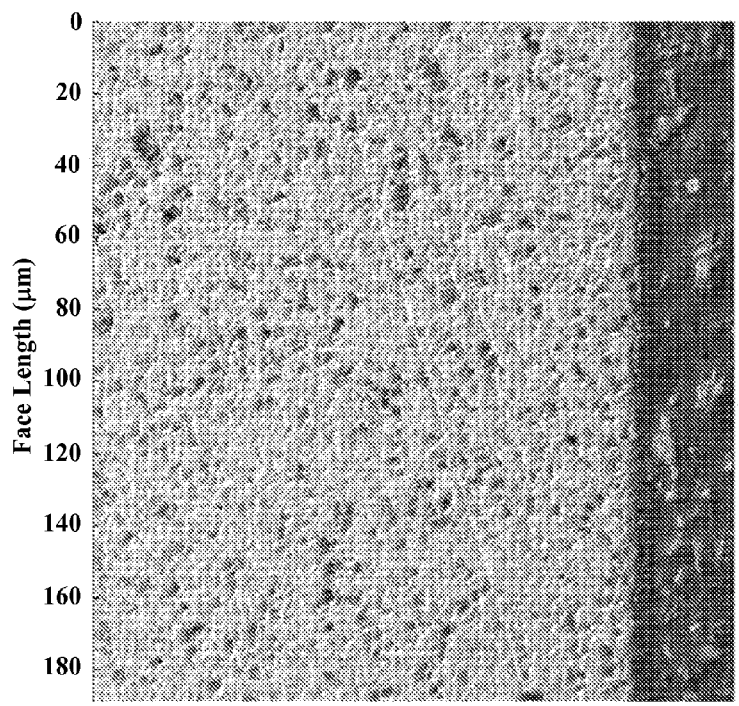
FIGS. 9A-C depicts IEDP results for $PrBaCo_2O_5$, infused at 400° C. for 5 min in 0.2 atm $^{18}O_2$ (99%) a: secondary electron image with $PrBaCo_2O_{5.5+x}$ region on the right and epoxy matrix on left. b SIMS image of the fraction of $^{18}O$, $f^{18}O=(^{18}O/(^{18}O+^{16}O))$ of the same region as in panel a. c: the profile of $f^{18}O$ derived from the image in panel b
Figure 9B:
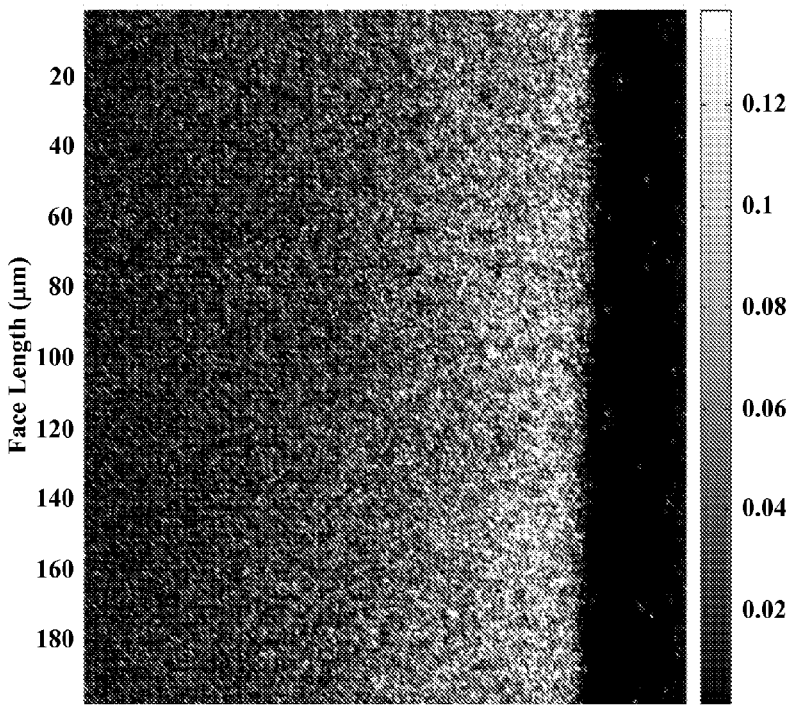
Figure 9C:
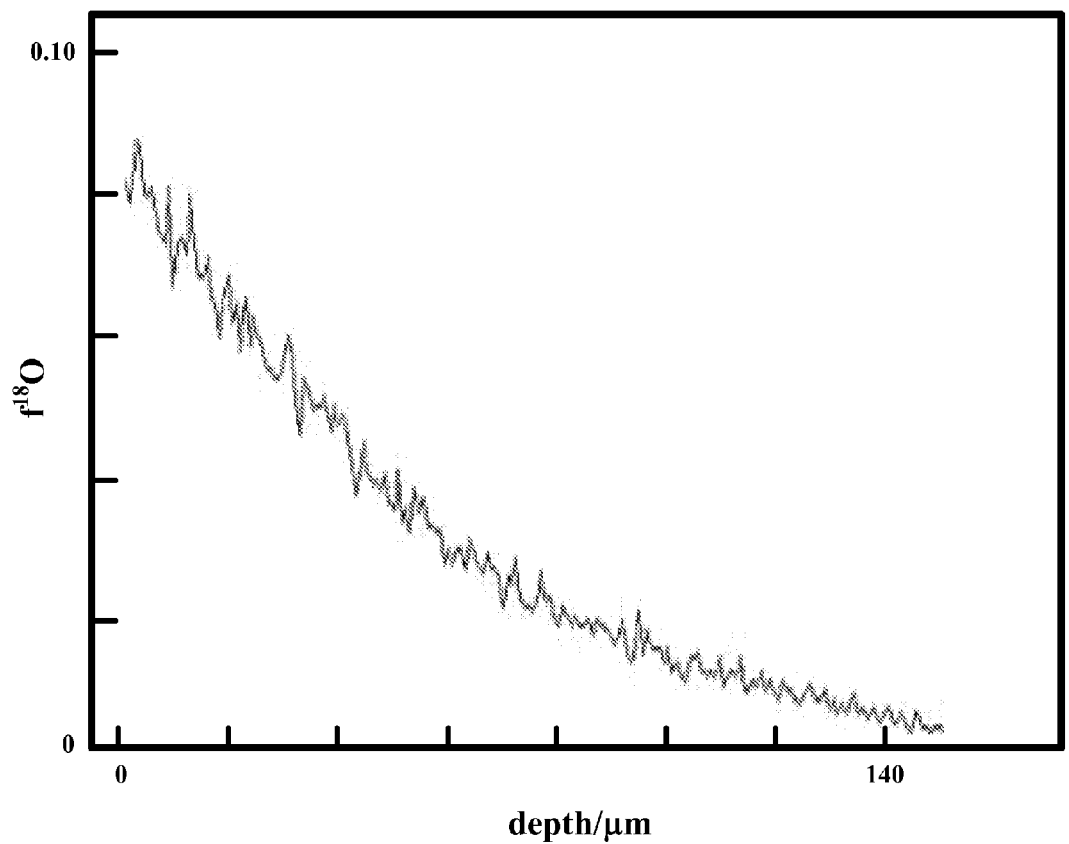

FIG. 9 shows ToFSIMS data from one polished cross-section infused in 0.20 atmosphere $O_2$ (99% $^{18}O$ abundance) at 400° C. for 300 seconds. The secondary electron and $^{18}O$ fraction ($f^{18}O = ^{18}O/(^{18}O+^{16}O)$) SIMS images (panels a and b, respectively) are shown along with the resulting $^{18}O$ depth profile from this region and its fit (panel c).

Uniform transport properties were indicated by reproducible profiles around the full perimeters of the polished specimens, except in regions where gas access to the surface was blocked by the sample supports during infusion. A few cracks were evident in this material (not shown), but these were apparently created during quenching of the sample because no perturbations of the $^{18}O$ fraction were seen at these crack surfaces.

FIGS. 10 and 11 compare, respectively, the $D_O$ and $k_O$ values derived from IEDP with those obtained from the ECR measurements and with transport parameters previously reported on related materials. These $D_O$ values from the two techniques are in good agreement. By contrast, the $k_O$ values from IEDP and ECR differ substantially. The surface activation rates can depend critically on subtle variations in sample preparation and pretreatment which, in turn, affect such important parameters as surface roughness and the surface density of defect sites and sample to sample variability in $k_O$ is a common feature of similar studies on both ceramic and thin-film materials. The central role of surface defects in the oxygen activation rate has been clearly shown on high quality thin films of cobaltite perovskite materials. The role of surface defects is further illustrated by the much higher values of $k_O$ measured on these ceramic samples than those measured on high-quality $PrBaCo_2O_{5.5+x}$ thin films.

Despite these uncertainties, it is clear that these double perovskite materials exhibit unusually high activity for oxygen activation and mobility. The solid lines in FIG. 10 represent the average values of several measurements by different groups on $La_2NiO_4$ (see J. A. Kilner and C. K. M. Shaw, Solid State Ionics 154-155, 2002, 523; F. Mauvy, J. M. Bassat, E. Bohem, P. Dordor, J. P. Loup, Solid State Ionics 158, 2003, 395; E. Boehm, J.-M. Bassat, M. C. Steil, P. Dordor, F. Mauvy, J.-C. Grenier, Solid State Sciences 5, 2003, 973; J. M. Bassat, P. Odier, A. Villesuzanne, C. Marin, M. Pouchard, Solid State Ionics 167, 2004, 341; and G. Kim, S. Wang, A. J. Jacobson in preparation 2006), and ECR measurements on $La_{0.5}Sr_{0.5}MO_{3-x}$ (M=Fe, Co) (see S. Wang, A. Verma, Y. L. Yang, A. J. Jacobson, B. Abeles, Solid State Ionics 140, 2001, 125 and J. Yoo, A. Verma, S. Wang, A. J. Jacobson, J. Electrochem. Soc. 152, 2005, A497).

In FIG. 11, because of the large variation in the reported values fork for $La_2NiO_4$ only the ECR data are included. Comparisons with the recent measurements on the double perovskite, $GdBaCo_2O_{5+x}$, are also instructive. Our activation energy values are lower than those obtained by Taskin, et al. (0.7 eV and 0.85 eV) (A. A. Taskin, A. N. Lavrov, Y. Ando, Appl. Phys. Lett. 86 2005, 091910). The pre-exponential factors and hence the absolute values of $D_{chem}$ and $k_{chem}$ are much higher for our materials than those reported in Taskin. For example, at 350° C., our values of $\sim 10^{-5}$ $cm^2s^{-1}$ and $\sim 10^{-3}$ $cm\ s^{-1}$ for $D_{chem}$ and $k_{chem}$, respectively, are 2-3 orders of magnitude higher than the values reported for $GdBaCo_2O_{5+x}$. The $D_O$ and $k_O$ values reported here, are remarkably high by comparison with other studies. For example, values of $D_O$ ($D^*$) can be obtained from the study by Taskin et al. by applying thermodynamic factors derived from their data. $G_O$ values for their $GdBaCo_2O_{5+x}$ materials (based on the total oxygen content) are estimated to be in the range of 80-100 for temperatures between 400° C. and 550° C. The derived values of D for their $GdBaCo_2O_{5+x}$ materials would thus be at least a factor of 10 lower than our values for PBCO. Comparisons between materials are complicated by structural differences, especially crystallinity, stoichiometry and surface contamination. For example, in studies on thin films of simple cobaltite perovskite oxides, it was observed that less perfectly ordered materials exhibit faster kinetics of both surface and bulk transport (X. Chen, S. Wang, Y. L. Yang, L. Smith, N. J. Wu, B.-I. Kim, S. S. Perry, A. J. Jacobson, A. Ignatiev Solid State Ionics 146/3-4, 2002 405-413). The fact that Taskin et al. studied single crystals of $GdBaCo_2O_{5+x}$, while our materials are polycrystalline dense ceramics is very likely a major reason for the higher rates observed here. In studies of high quality epitaxial PBCO thin films on (100) $SrTiO_3$, the inventors have recently obtained significantly lower values of $k_O$ than observed here (see, G. Kim, S. Wang, A. J. Jacobson, W. Donner, C. L. Chen, L. Reimus, P. Brodersen, C. A. Mims. Appl Phys. Lett. 88, 2006, 024103). At 500° C., measured values of $k_{chem}$ on a 200 nm film was $5\times10^{-1}$ $cm\ s^{-1}$—several hundred times smaller than the values observed here on our ceramic materials. These experimental data clearly evidence that these materials are ideally suited for improved solid oxide fuel cell cathodes, oxygen permeation membranes, and sensors.

Figure 12:
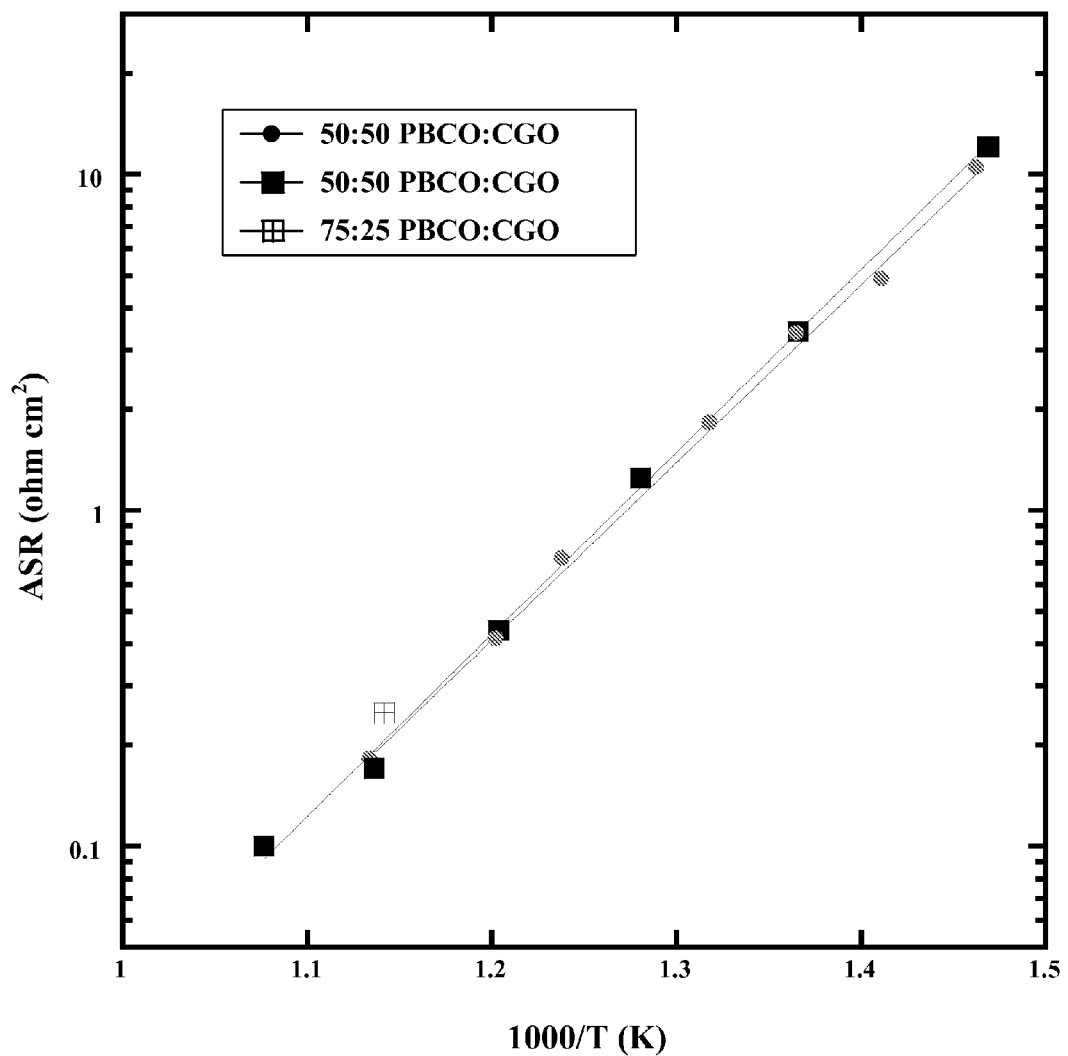
FIG. 12 depicts Area specific resistance a function of temperature for a symmetric CGO-PBCO/CGO/CGO-PBCO cell

Moreover, the rapid oxygen ion diffusion and surface exchange is reflected in the area specific resistance of electrodes containing PBCO. The data in FIG. 12 show the area specific resistance of PBCO/CGO composite electrodes on a CGO electrolyte measured in three separate experiments. At 600° C., the measured value is only 0.15 ohms cm² consistent with the rapid exchange kinetics.

Fuel Cell Examples

The specific objectives of the proposed research are to develop cathode materials that meet the electrode performance targets of 1.0 W/cm² at 0.7 V in combination with YSZ at 700° C. and with GDC, LSGM or bismuth oxide based electrolytes at 600° C. The performance targets imply an area specific resistance of about 0.5 Ωcm² for the total cell.

Further measurements on the oxygen deficient double perovskite $PrBaCo_2O_{5.5+d}$ (PBCO) are reported. The high electronic conductivity and rapid diffusion and surface exchange kinetics of PBCO suggest its application as cathode material in intermediate temperature solid oxide fuel cells (SOFCs). Examples have been completed on symmetric cells and on complete cells: Ni/CGO/CGO/PBCO/CGO.

Introduction

The present cathodic materials have the following properties: 1.0 W/cm² at 0.7 V in combination with YSZ at 700° C. and with CGO, LSGM electrolytes at 600° C. The new cathode materials were synthesized and characterized and their kinetic parameters measured along with their thermal and chemical compatibility with different electrolytes and their surface exchange rates, diffusion coefficients and interfacial transport values.

Summary

The high electronic conductivity and rapid diffusion and surface exchange kinetics of the oxygen deficient double perovskite $PrBaCo_2O_{5.5+\delta}$ (PBCO) make such materials ideally suitable as cathode material in intermediate temperature solid oxide fuel cells. The material measurements on symmetric cells with PBCO electrodes had low ASR values at 600° C. as well as measurements on complete cells and for electrolyte supported cells.

Sample Preparation

The CGO (gadolinium doped ceria) powder was die-pressed into a pellet and sintered at 1450° C. for 8 h in air. The thickness of the CGO electrolyte pellet was reduced to 0.8 mm by polishing with SiC paper. A 50:50 wt. % mixture of $PrBaCo_2O_{5+x}$ (PBCO) and CGO (50 wt %) was used as the cathode, and a Ni-CGO (30 vol %) material was used as the anode. The PBCO-CGO and NiO-CGO pastes were prepared from powder mixtures of PBCO and CGO, NiO and CGO, with the addition of terpineol. The NiO-CGO paste was applied onto the CGO electrolyte and fired at 1300° C. for 2 h in air. Then, a thin PBCO-CGO green tape (25 mm), which was prepared by tape casting, was stuck to the other side of the CGO electrolyte pellet using terpineol and fired at 1100° C. for 30 min in air. The PBCO-CGO paste was subsequently applied onto the surface of the sintered PBCO-CGO tape, and also fired at 1100° C. for another 2 h in air to increase the thickness of the cathode. The active electrode area of the cathode and anode was 1.27 cm². Two pieces of gold mesh were used as current collectors and bonded onto both surfaces of the cathode and anode by firing with gold paste at 700° C. for 30 min in air.

Electrical Measurements

An electrolyte supported solid oxide fuel cell with the following arrangement was tested from 500° C. to 700° C. at 25° C. intervals:

97 vol % $H_2$+3 vol % $H_2O$, Ni-CGO anode/CGO electrolyte/PBCO-CGO cathode, air The anode side of the single cell was sealed onto an alumina tube with a gold O-ring under spring loading, while the cathode was simply exposed to air. Before testing, the cell was heated to 800° C. to deform the gold O-ring and reduce the NiO to Ni with hydrogen flowing over the anode. The flow rate of the hydrogen fed to the anode was 150 cc/min. Cell current-voltage (I-V) plots were measured using an Arbin Testing System (Model BT 4+). The ohmic resistance of the cell was determined by current interrupt measurements using Keithley SourceMeters.

Figure 13:
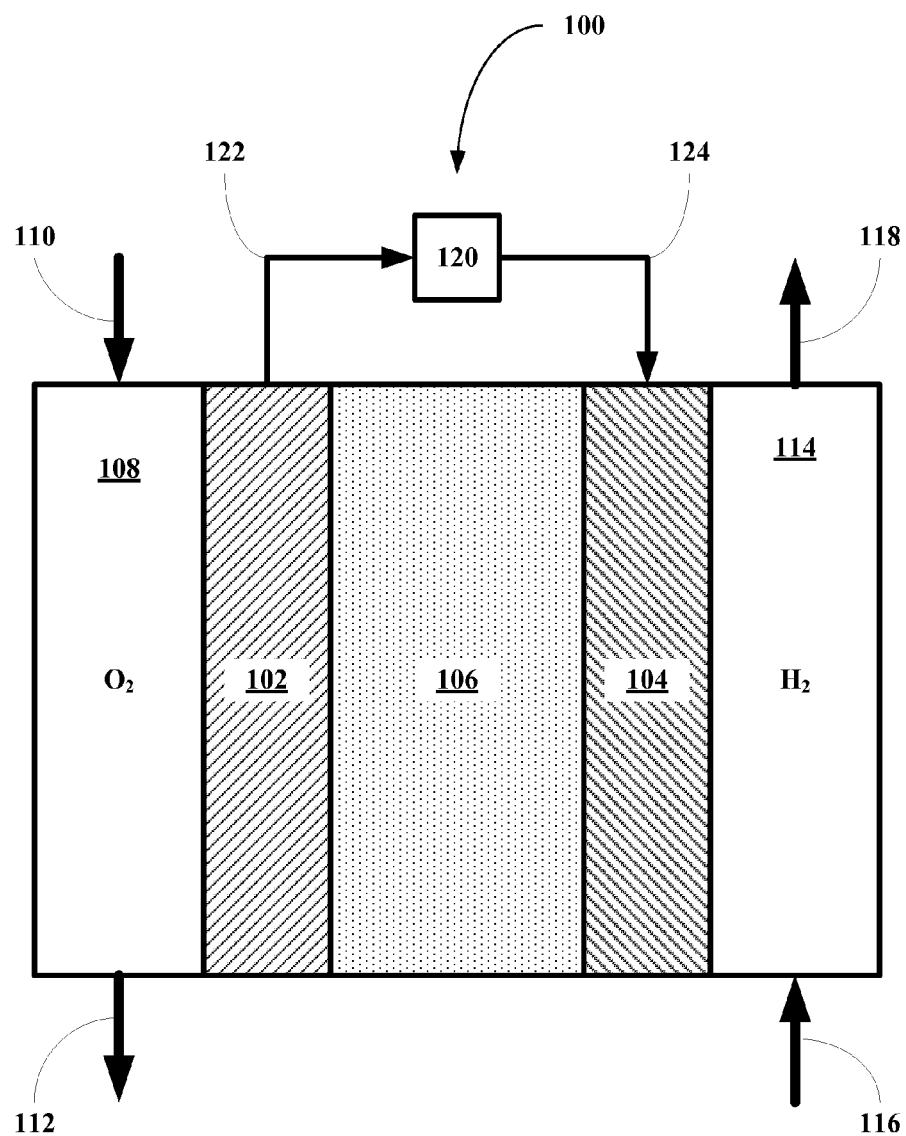
FIG. 13 depicts a hydrogen/oxygen fuel cell of this invention.

Referring now to FIG. 13, an illustrative fuel cell of this invention, generally, 100, is shown to include a cathode 102 comprising a composition including at least one compound of formula (I) and a conventional anode 104 with an intermediate temperature electrolyte 106 interposed therebetween. The electrolyte 106 can comprise a conventional electrolyte or a composition including at least one compound of formula (II). The cathode 102 is placed adjacent an oxygen chamber 108 containing an oxygen containing gas including, without limitation, air, other nitrogen-oxygen gas mixtures, an oxygen-argon gas mixture, an oxygen-helium gas mixture, or pure oxygen so that the oxygen containing gas is in contact with one of the surfaces of the cathode 102. The anode 104 is placed adjacent a hydrogen chamber 114 containing a hydrogen containing gas including, without limitation, pure hydrogen gas, a hydrogen-helium gas mixture, or other hydrogen-inert gas mixtures so that the hydrogen containing gas is in contact with one of the surfaces of the anode 104. The oxygen containing gas and the hydrogen containing gas can include water vapor at any desired level. Generally, the fuel cell 100 is operated at an intermediate temperature between about 400° C. and about 800° C. Generally, the fuel cell 100 is operated at or ner atmosphere pressure, but lower and higher pressures can be used as well depending on the exact application to which the fuel cell is to be used. In certain applications, higher pressure are used and in other lower pressures are used. The oxygen chamber 108 supports a flow as indicated by solid arrows 110 (in) and 112 (out) as does the hydrogen chamber 114, solid arrows 116 (in) and 118 (out). The fuel cell 100 also includes a resistive load 120 connected to the cathode 102 via a wire 122 and to the anode 104 via a wire 124. The resistive load 120 can be any electric device capable of being powered by an hydrogen/oxygen fuel cell. Of course, the effluent hydrogen gas will contain the water formed from the reaction of hydrogen and oxygen.

Results

Figure 14:
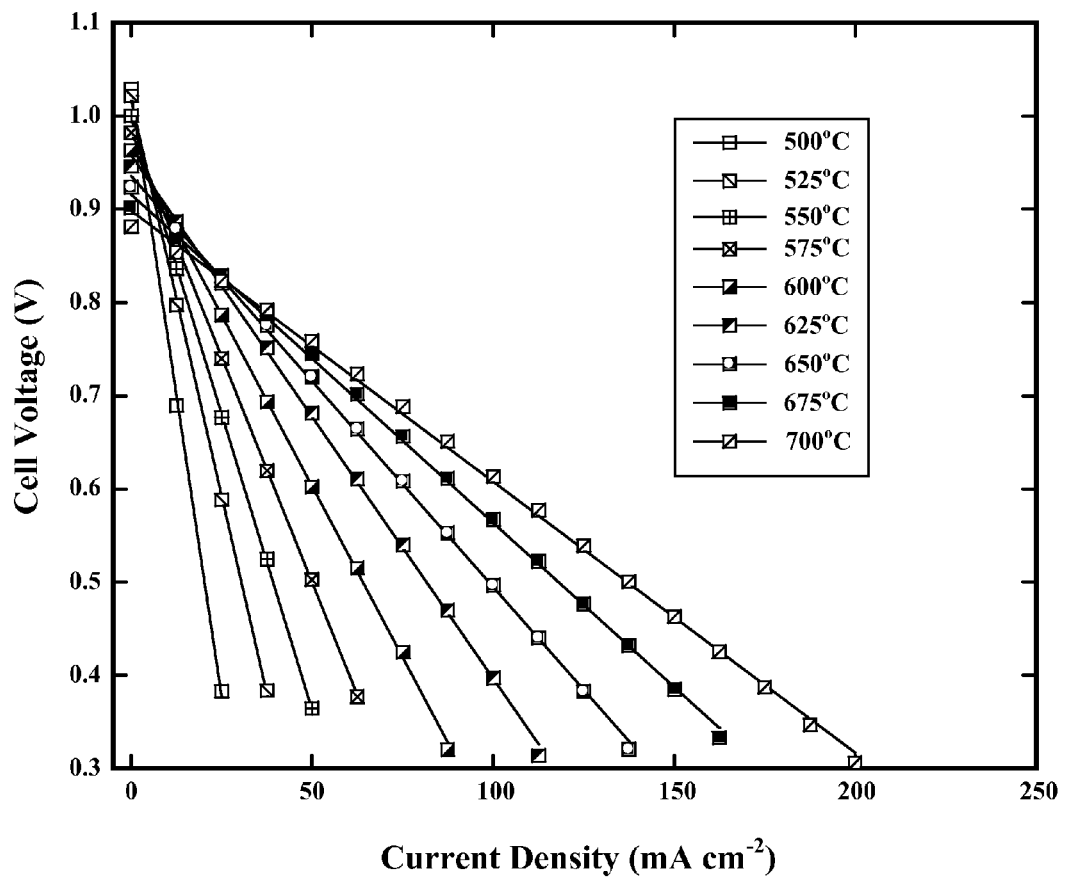
FIG. 14 depicts V-I characteristics of the CGO electrolyte supported solid oxide fuel cell with a PBCO cathode.

The voltage-current (V-I) characteristics of the cell are shown in FIG. 14.

Figure 15:
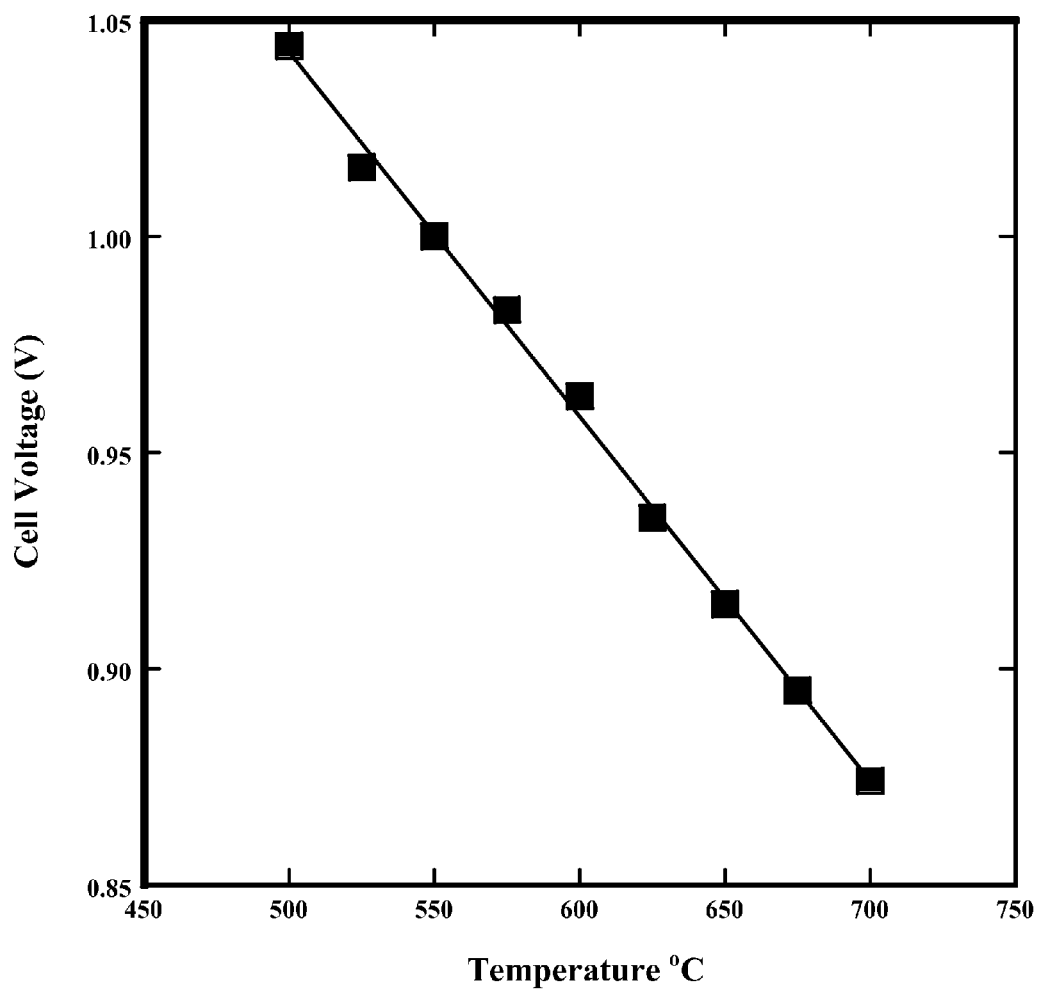
FIG. 15 depicts open circuit voltages of a CGO/PBCO electrolyte supported solid oxide fuel cell.

As expected for CGO, the open circuit voltages (OCV) (FIG. 15) range from 0.87 V at 700° C. to 1.04 V at 500° C. and are lower than the Nernst potential. The values for the OCV are comparable to those typically measured with ceria-based electrolytes. The decreased OCV is attributed to the increasing contribution of electronic conductivity to the total conductivity as the temperature is increased in a reducing environment.

Figure 16:
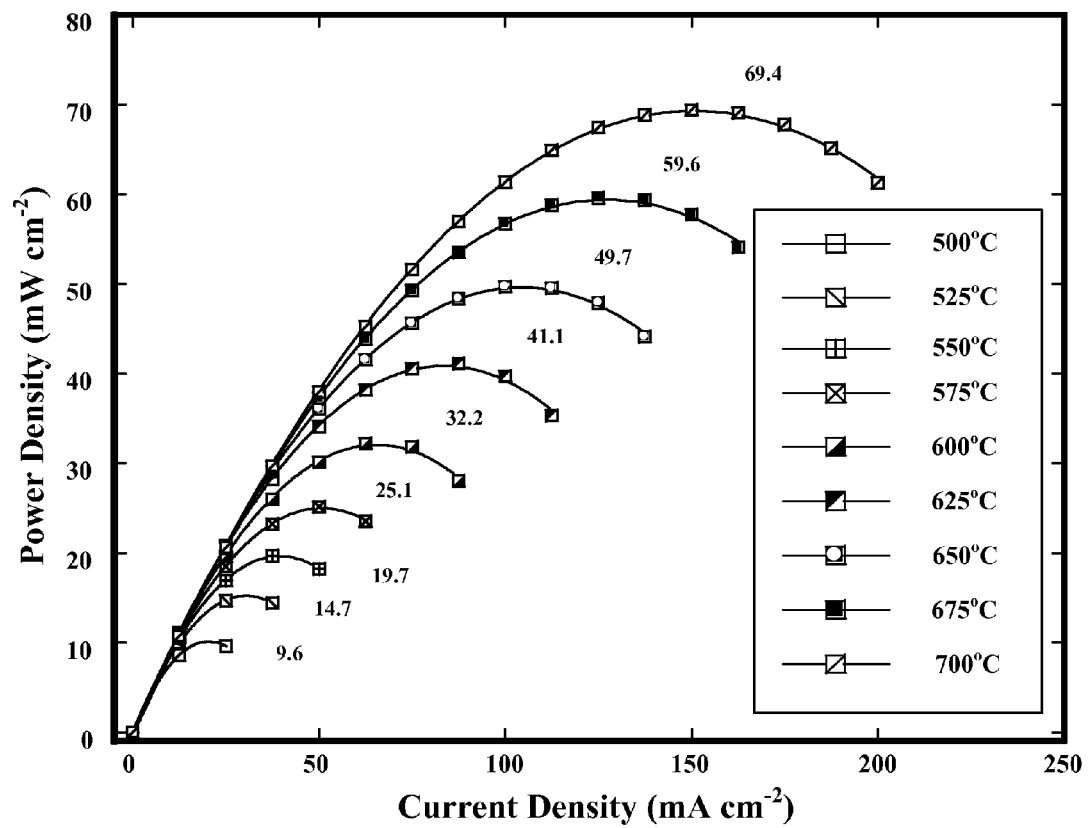
FIG. 16 depicts power densities of the cell as a function of current density.
Figure 17:
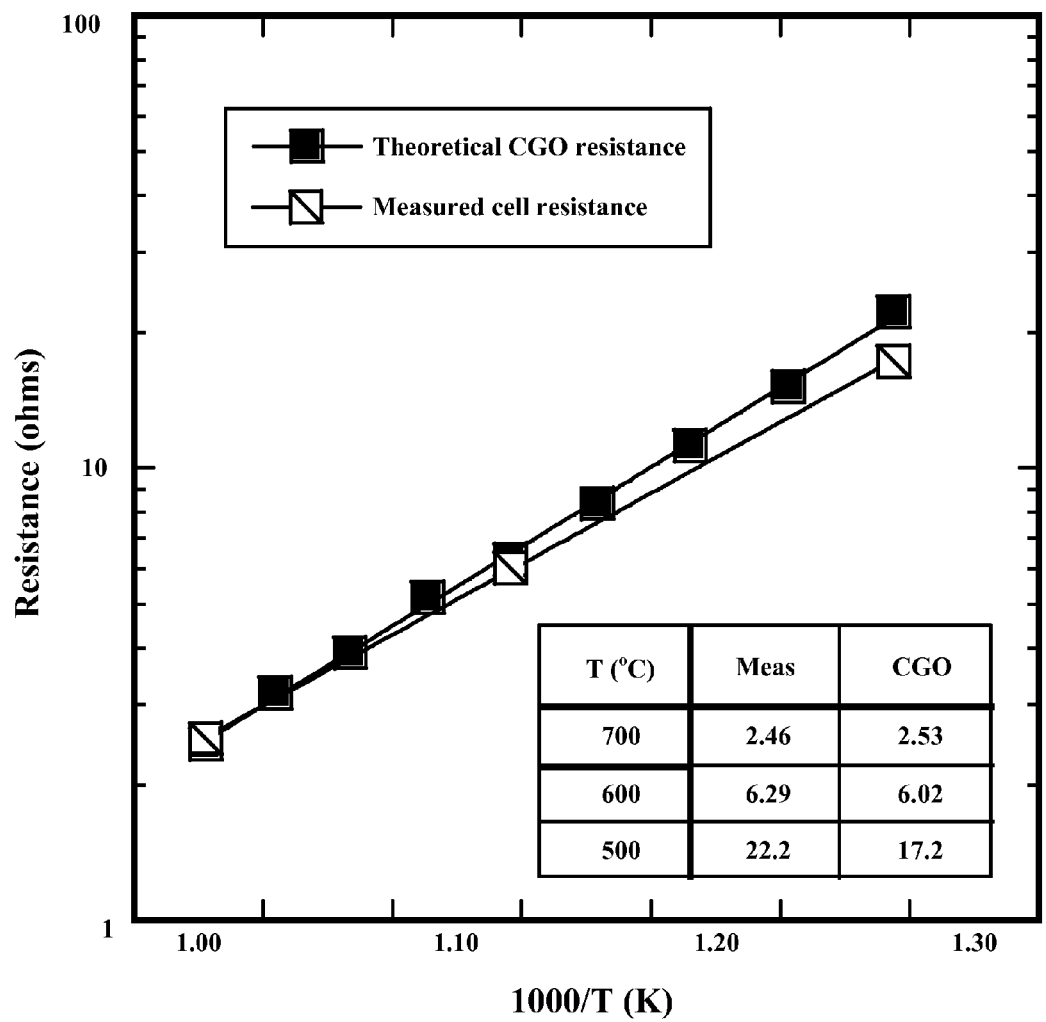
FIG. 17 depicts a comparison of the ohmic resistance of the cell measured by current interrupt technique and the calculated theoretical resistance of the electrolyte.

The power densities as a function of current density from 500° C. to 700° C. are shown in FIG. 16. The maximum power densities are ranging from 9.6 mW/cm² at 500° C. to 69.4 mW/cm² at 700° C. The power densities achievable with this cell are primarily limited by the resistance of the electrolyte. The electrolyte is 0.8 mm thick and contributes the major part of the total cell resistance above 500° C. The total ohmic resistance of the cell was determined using the current interruption technique. The results are compared with the calculated resistance of CGO using literature data in FIG. 17.

At 700° C. the ohmic resistance of the cell is effectively equal to that of the electrolyte. At 600° C., the difference is small (0.27 ohms) and increases to 5.4 ohms at 500° C. The present experimental data do not enable the specific electrode contributions to be isolated. Nevertheless at 600° C. the data indicate low electrode resistances.

Initial tests of the performance of PBCO as a cathode material were carried out in a complete cell. A composite electrode of PBCO/CGO supported on a thick (0.8 mm) CGO electrolyte. The results as expected are dominated by the electrolyte resistance but at 600° C., the ohmic resistance of the other components is only ~0.27 ohms.

Figure 18:
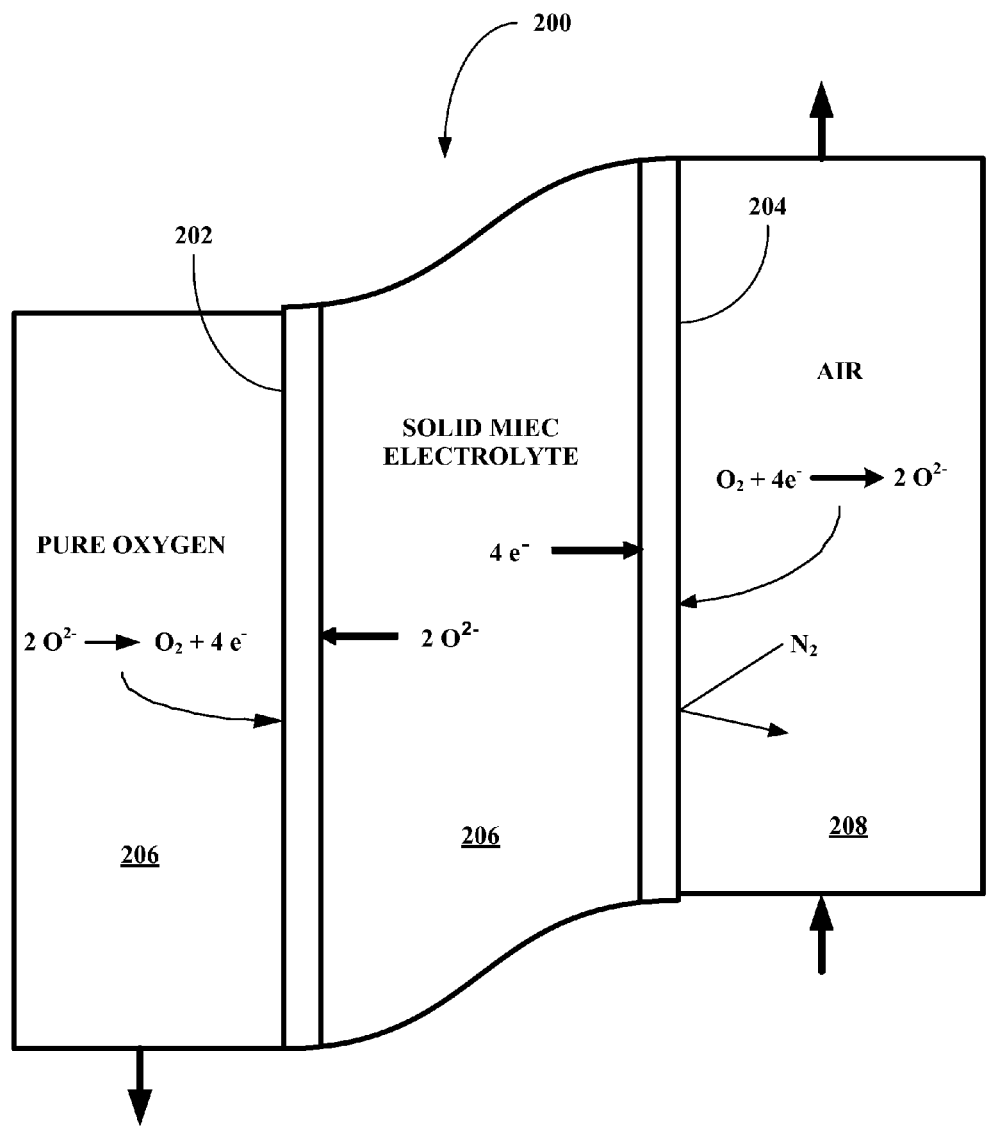
FIG. 18 depicts a block diagram of an oxygen separation apparatus of this invention.

Referring now to FIG. 18, a block diagram of an oxygen separation apparatus of this invention, generally 200, is shown to include a conventional anode 202 and a conventional cathode 204 with an oxygen diffusion solid phase membrane 206 interposed therebetween. The membrane 206 can comprise a composition including at least one compound of formula (I) and optionally a secondary component such as GCO (gallium doped cerium oxide) or an inert filler to stabilize the membrane 206 during starting (heating to operating temperature) and stopping (cooling to ambient temperatures). The inert filler is adapted to compensate for the thermal expansion coefficient of the compounds of formula (I). The anode 202 is placed adjacent a first gas chamber 208 containing an oxygen containing gas including, without limitation, other nitrogen-oxygen gas mixtures, an oxygen-argon gas mixture, an oxygen-helium gas mixture, or flue gases, from which a purified oxygen gas is desired. The oxygen containing gas can include water vapor at a desired level. Generally, the oxygen containing gas is at an elevated pressure at a temperature between about 400° C. and about 800° C. Generally, the elevated pressure is between about 1 atmosphere and 20 atmospheres. In certain embodiments, the elevated pressure is between about 5 atmospheres and 15 atmospheres. In other embodiments, the elevated pressure is between about 7.5 atmospheres and 12.5 atmospheres. The cathode 204 is placed adjacent a purified oxygen receiving chamber 210. The chamber 210 is maintained near atmospheric or ambient pressure or slightly below atmospheric pressures to increase the pressure differently across the membrane. The chamber 208 can support a flow, solid arrow, of purified oxygen out of the chamber 208, while the chamber 210 can support an air flow into and out of the chamber 210, solid arrows.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A cathodic composition for intermediate temperature solid oxide fuel cells comprising at least one compound having the general formula (I):

$$(ABO_3)_p(A'BO_{2+x})_q(A'O_{2+x})_r \qquad (I)$$

where p, q, and r are integers, x is a real number having a value greater than 0.0 and less than 1.0 or $0.0 < x < 1.0$, A is a divalent metal or mixture of divalent metals, A' is a trivalent metal or mixture of trivalent metals, B is a transition metal or mixture of transition metals, the three distinct building blocks: $ABO_3$, $A'BO_{2+x}$ and $A'O_{2+x}$ are combined in different ways according to the following rules: $p \geq q$ and $q \geq r$, where the compounds have high oxygen activation activity and high oxygen mobility at an intermediate temperature between about 400° C. and about 800° C. reducing an operating temperature of intermediate temperature fuel cells currently operating at temperatures above 800° C., where the trivalent metal ions A' are readily convertible between their plus three oxidation state and their plus four oxidation state, but in a lattice of the composition, the trivalent metal ions A' are rendered not readily convertible between their plus three and plus four oxidation states, where the transition metals B are all square pyramidally coordinated, and where ordered A cations localize oxygen vacancies into layers improving conductivity and oxygen diffusivity at the operating temperature.

2. The composition of claim 1, wherein A is selected from the group consisting of Ba, Sr or Pb or mixture or combinations thereof, A' is selected from the group consisting of Y, La, Ce, Pr, Nd, Pm, Sm, Eu, Gd, Tb, Dy, Ho, Er, Tm, Yb, and Lu or mixtures or combinations thereof, B is selected from a first transition elements excluding scandium, titanium, and zinc or mixtures or combinations thereof.

3. The composition of claim 1, wherein B is selected from the group consisting of manganese, iron, cobalt and nickel or mixtures or combinations thereof.

4. The composition of claim 1, wherein B is selected from the group consisting of iron, cobalt and mixtures or combinations thereof.

5. The composition of claim 1, wherein B is iron.

6. The composition of claim 1, wherein B is cobalt.

7. The composition of claim 1, wherein p ranges from 1 to 4.

8. The composition of claim 7, wherein if p is 4, then q ranges from 1 to 4 and r ranges from 0 to 4 so that $p \geq q$ and $q \geq r$ and $p \geq r$.

9. The composition of claim 7, wherein p is greater than q, q greater than r, and p is greater than r.

10. The composition of claim 1, wherein A is Ba, A' is selected from the group consisting of Y, La, Pr, Nd, Sm or mixtures or combinations thereof and B is selected from the group consisting of Fe, Co, or mixtures or combinations thereof.

11. The composition of claim 1, the compound of formula (I) are selected from the group $PrBaCo_2O_{5.5+x}$, $PrBaFe_2O_{5.5+x}$, $NdBaCo_2O_{5.5+x}$, $NdBaFe_2O_{5.5+x}$ and mixtures or combination thereof.

12. The composition of claim 1, the compound of formula (I) are selected from the group $PrBaCo_2O_{5.5+x}$, $PrBaFe_2O_{5.5+x}$, and mixtures or combination thereof.

13. The composition of claim 1, the compound of formula (I) are selected from the group $NdBaCo_2O_{5.5+x}$, and $NdBaFe_2O_{5.5+x}$ and mixtures or combination thereof.

14. The composition of claim 1, the compound of formula (I) is $PrBaCo_2O_{5.5+x}$.

15. The composition of claim 1, the compound of formula (I) $NdBaCo_2O_{5.5+x}$.

16. The composition of claim 1, wherein the intermediate temperature is between about 400° C. and about 700° C.

17. The composition of claim 1, wherein the intermediate temperature is between about 400° C. and about 600° C.

18. The composition of claim 1, wherein the intermediate temperature is between about 450° C. and about 800° C.

19. The composition of claim 1, wherein the intermediate temperature is between about 450° C. and about 700° C.

20. The composition of claim 1, wherein the intermediate temperature is between about 450° C. and about 600° C.